United States Patent
Yoshida et al.

(10) Patent No.: US 7,602,380 B2
(45) Date of Patent: Oct. 13, 2009

(54) DISPLAY DEVICE WITH OPTICAL INPUT FUNCTION

(75) Inventors: Masahiro Yoshida, Fukaya (JP); Takashi Nakamura, Saitama (JP); Kazutaka Nagaoka, Kumagaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 820 days.

(21) Appl. No.: 11/195,727

(22) Filed: Aug. 3, 2005

(65) Prior Publication Data

US 2006/0033729 A1    Feb. 16, 2006

(30) Foreign Application Priority Data

Aug. 10, 2004  (JP) .............................. 2004-233459
Mar. 7, 2005   (JP) .............................. 2005-062891

(51) Int. Cl.
  G09G 5/00   (2006.01)
(52) U.S. Cl. ...................... 345/173; 175/207
(58) Field of Classification Search ................. 345/173, 345/175
  See application file for complete search history.

(56) References Cited

U.S. PATENT DOCUMENTS

| | | | | |
|---|---|---|---|---|
| 4,870,559 A | * | 9/1989 | Hyatt .............................. 700/1 |
| 5,838,308 A | * | 11/1998 | Knapp et al. ................. 345/173 |
| 6,809,765 B1 | * | 10/2004 | Tao ............................. 348/273 |
| 6,882,364 B1 | * | 4/2005 | Inuiya et al. ................. 348/252 |
| 6,963,674 B2 | * | 11/2005 | Shiomi ....................... 382/312 |
| 2004/0156563 A1 | * | 8/2004 | Shiomi ....................... 382/312 |

FOREIGN PATENT DOCUMENTS

| | | |
|---|---|---|
| CN | 1482588 A | 3/2004 |
| JP | 2002-182839 | 6/2002 |
| JP | 2004-45875 | 2/2004 |

OTHER PUBLICATIONS

Song Zhaohui, et al, "Optronics Lasers", China Academic Journal Electronic Publishing House vol. 3, No. 6, Dec. 1992, pp. 356-360.

* cited by examiner

*Primary Examiner*—Bipin Shalwala
*Assistant Examiner*—Afroza Y Chowdhury
(74) *Attorney, Agent, or Firm*—Oblon, Spivak, McClelland, Maier & Neustadt, L.L.P.

(57) ABSTRACT

A display device includes a plurality of scanning lines, a plurality of signal lines, a plurality of pixel circuits and sensor circuits, a signal line drive circuit and scanning line drive circuit which drive the plurality of pixel circuits, and a precharge circuit and sensor control circuit which drive the sensor circuits. A filter subjects image data to an interpolation process to compensate for a gradation value of an output. In a signal processing section, the area of a light receiving area is calculated and it is determined that a light source is set in contact with a display screen.

8 Claims, 22 Drawing Sheets

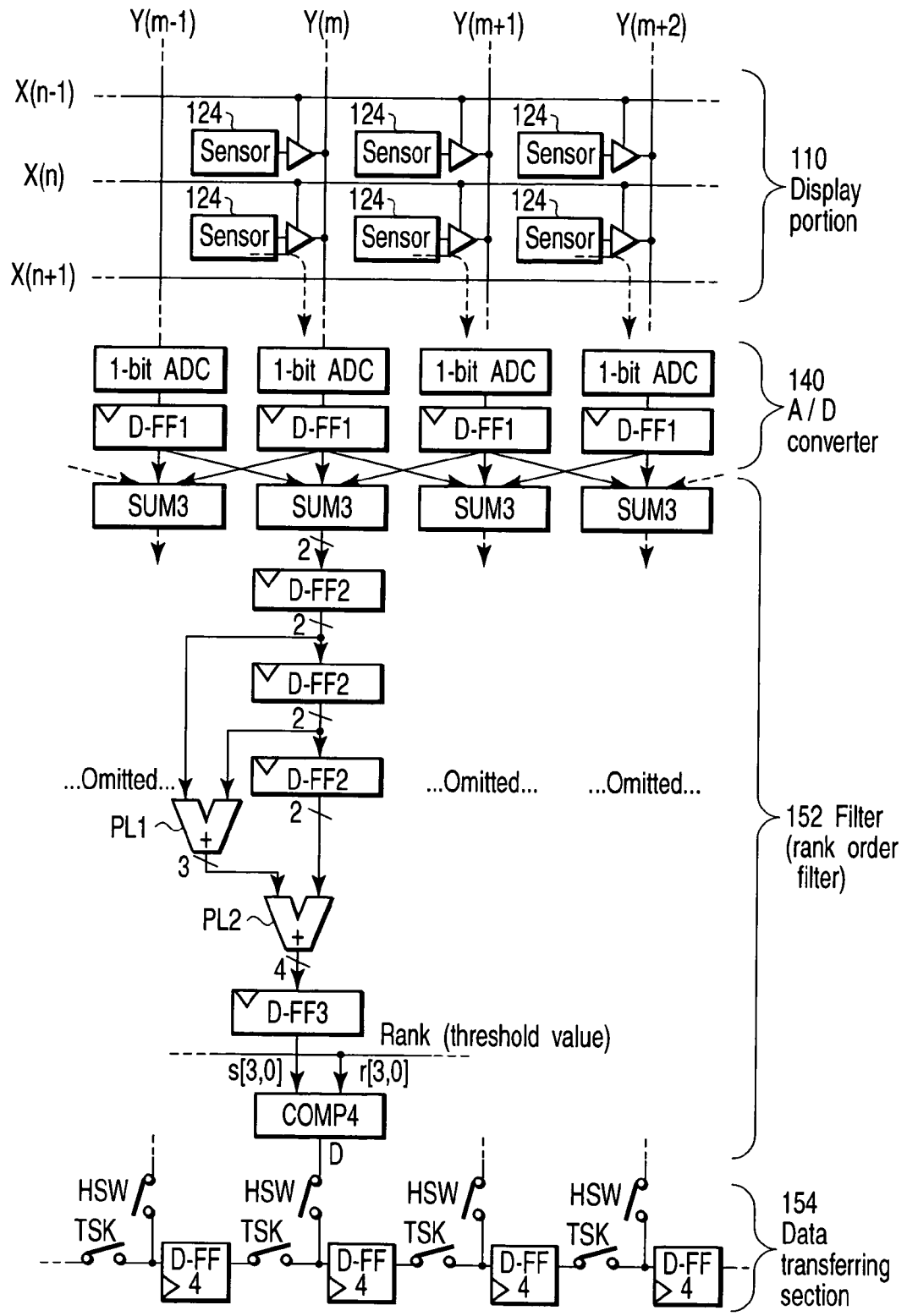
F I G. 8

| Input | | Output | |
|---|---|---|---|
| A | B | S | L |
| 0 | 0 | 0 | 0 |
| 1 | 0 | 0 | 1 |
| 0 | 1 | 0 | 1 |
| 1 | 1 | 1 | 1 |

S=A·B
L=A+B

| Input | | | Output | | |
|---|---|---|---|---|---|
| A | B | C | S | M | L |
| 0 | 0 | 0 | 0 | 0 | 0 |
| 1 | 0 | 0 | 0 | 0 | 1 |
| 0 | 1 | 0 | 0 | 0 | 1 |
| 0 | 0 | 1 | 0 | 0 | 1 |
| 1 | 1 | 0 | 0 | 1 | 1 |
| 0 | 1 | 1 | 0 | 1 | 1 |
| 1 | 0 | 1 | 0 | 1 | 1 |
| 1 | 1 | 1 | 1 | 1 | 1 |

S=A·B·C
M=A·B+B·C+C·A
L=A+B+C

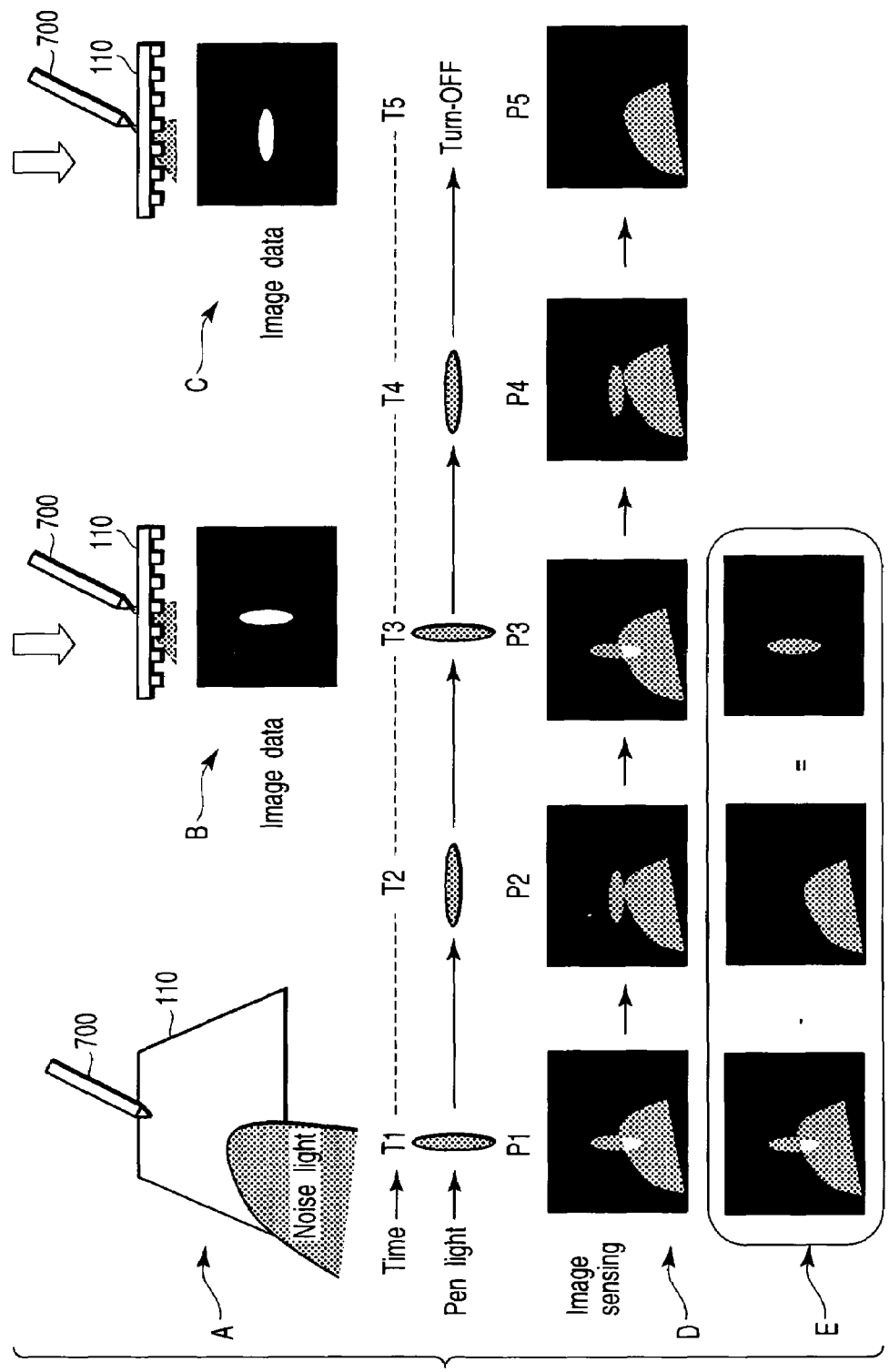
F I G. 23

DISPLAY DEVICE WITH OPTICAL INPUT FUNCTION

CROSS-REFERENCE TO RELATED APPLICATIONS

This application is based upon and claims the benefit of priority from prior Japanese Patent Applications No. 2004-233459, filed Aug. 10, 2004; and No. 2005-062891, filed Mar. 7, 2005, the entire contents of both of which are incorporated herein by reference.

BACKGROUND OF THE INVENTION

1. Field of the Invention

This invention relates to a display device with an optical input function which can input information by, for example, causing light from a light source such as a light pen to illuminate the display screen. With the display device, illuminated position information or contact position information on the display screen illuminated by the light is detected. More specifically, this invention is made clearer by explaining embodiments to be described later.

2. Description of the Related Art

Recently, a liquid crystal display device is widely used as a display device for various equipment such as a mobile telephone or notebook-sized personal computer. The liquid crystal display device is configured by an array substrate on which liquid crystal pixel portions including thin film transistors (TFT), liquid crystal capacitors and auxiliary capacitors are arranged at intersecting portions between a plurality of scanning lines and a plurality of signal lines, and a drive circuit which drives the scanning lines and signals lines. However, recently, with the development of integrated circuit technology and practical implementation of improved processing techniques, part of the drive circuit is also formed on the array substrate and an attempt is made to reduce the liquid crystal display device in size and weight.

On the other hand, a display device in which a contact type area sensor having an image fetching function is arranged on an array substrate is proposed as a display device having an optical input function. The conventional display device of this type having the optical input function includes display means configured by, for example, liquid crystal pixel portions arranged at intersecting portions between a plurality of scanning lines and a plurality of signal lines and photosensing means formed of photodiodes, for example. In the photosensing means, the amount of charges of capacitors connected to the photodiodes varies according to the amount of light received by the photodiodes. Therefore, the display device can fetch an image since image data can be formed by detecting voltages across a plurality of capacitors at the intersecting portions.

With the display device having the optical input function, a method for attaining multi-gradation image data corresponding to the illumination intensity of incident light based on image data obtained in a plurality of image photographing conditions by an image processing operation is proposed.

Further, a method for fetching an image while an image is being displayed by inserting an image photographing frame between display frames which are used to display an image is proposed. By using the above method, for example, a pen-type light source can be used as a coordinate input device of the display device by illuminating the display screen by use of the pen-type light source. A coordinate calculation algorithm or tap detecting algorithm used to serve the above purpose is proposed (refer to Jpn. Pat. Appln. KOKAI Publication No. 2002-182839, for example).

(A1)

In the conventional display device having the optical input function, since image data having dot-form defects or line-form defects caused and generated in the manufacturing process is output to the exterior as it is, it becomes necessary to perform an image processing operation which compensates for the defects by use of an external IC. In order to perform the image processing operation, it is generally required to provide a memory with a storage capacity corresponding to several lines of image data in the IC, and therefore, there occurs a problem that the circuit scale of the IC becomes large and the cost thereof becomes high.

If the compensation process is not performed by use of the external IC, it becomes necessary to select and use only a display device having an optical input function which is free from the defects. As a result, there occurs a problem that the manufacturing yield is lowered.

(B1)

Further, in the display device having the optical input function, for example, when coordinates are input by illumination by use of a light source such as a light pen, there occurs a problem that it is difficult to determine whether or not the tip end of the pen is set in contact with the display screen since the light source is always kept ON. In order to solve the above problem, a method for determining the contact/non-contact state by attaching a switch to the tip end of the pen and turning ON the light source only at the contact time may be considered. However, with this method, it is difficult to realize smoothly writing feelings.

BRIEF SUMMARY OF THE INVENTION (A2) An object of the embodiments is to provide a display device having an optical input function in which portions partially lost due to dot-form defects or line-form defects are compensated for, an increase in the circuit scale and a rise in the cost of the external IC are suppressed and the manufacturing yield is increased.

(B2) An object of the embodiments is to provide a display device having an optical input function which can adequately determine light input/non-input (or contact/non-contact state) without attaching a switch which determines the contact/non-contact state to a light source.

(C2) Further, an object of the embodiments is to provide a display device having an optical input function which can compensate for portions which are partially lost due to the presence of dot-form defects or line-form defects and adequately determine light input/non-input (or contact/non-contact).

(A3)

According to one aspect of this invention, there is provided a display device which comprises a plurality of scanning lines arranged in parallel, a plurality of signal lines arranged to intersect with the plurality of scanning lines, a plurality of pixel circuits arranged at intersecting portions between the plurality of scanning lines and the plurality of signal lines, photosensor portions provided at least one for each or every preset number of the plurality of pixel circuits, pixel drive means for driving the plurality of pixel circuits via the plurality of scanning lines and the plurality of signal lines, a sensor drive means which controls the photosensing portions, and an output processing section which transforms the output from the photosensing portions to image data, wherein the output processing section includes a filter which compensates for gradation values of images from the photosensing means.

(B3)

According to another aspect of this invention, there is provided a display device which comprises a plurality of scanning lines arranged in parallel, a plurality of signal lines arranged in parallel to intersect with the plurality of scanning lines, a plurality of display means arranged at intersecting portions between the plurality of scanning lines and the plurality of signal lines, a plurality of photosensing means arranged at the intersecting portions between the plurality of scanning lines and the plurality of signal lines, drive means for driving the plurality of display means via the plurality of scanning lines and the plurality of signal lines to display an image on the display screen, and a signal processing section which processes photosensing signals from the plurality of photosensing means, wherein an operation processing section which derives information of an area of the light receiving area on the display screen by use of the photosensing signals when light emitted from the tip end of the light source means is applied to the optical display screen and a determining section which determines that light is input when the information of the area of the light receiving area lies within a preset parameter setting range.

(C3)

Further, according to another aspect of this invention, there is provided a display device which includes both of the means of A3 and the means of B3.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a diagram showing an example of the circuit configuration which processes an output of the sensor circuit shown in FIG. 1;

FIG. 23 is a view for illustrating an example of a method for attaining a precise photosensing signal when light from the tip end of the light pen 700 which is used as a light source is applied to the display screen.

DETAILED DESCRIPTION OF THE INVENTION

There will now be described embodiments of this invention with reference to the accompanying drawings.

In one embodiment of this invention, roughly divided features are explained in the following order according to the order of readout of pixel data from a sensor circuit.

(1) A circuit which can compensate for a portion which is partially lost due to the presence of dot-form defects or line-form defects in the LCD is obtained.

(2) In this case, an increase in the circuit scale of the external IC (signal processing section) and a rise in the cost thereof are suppressed.

(3) A display device with an optical input function having a high manufacturing yield is obtained.

(4) A display device with an optical input function which can correctly determine a contact/non-contact state without attaching a switch which is used to determine the contact/non-contact state to the light source is obtained.

Figure 1:
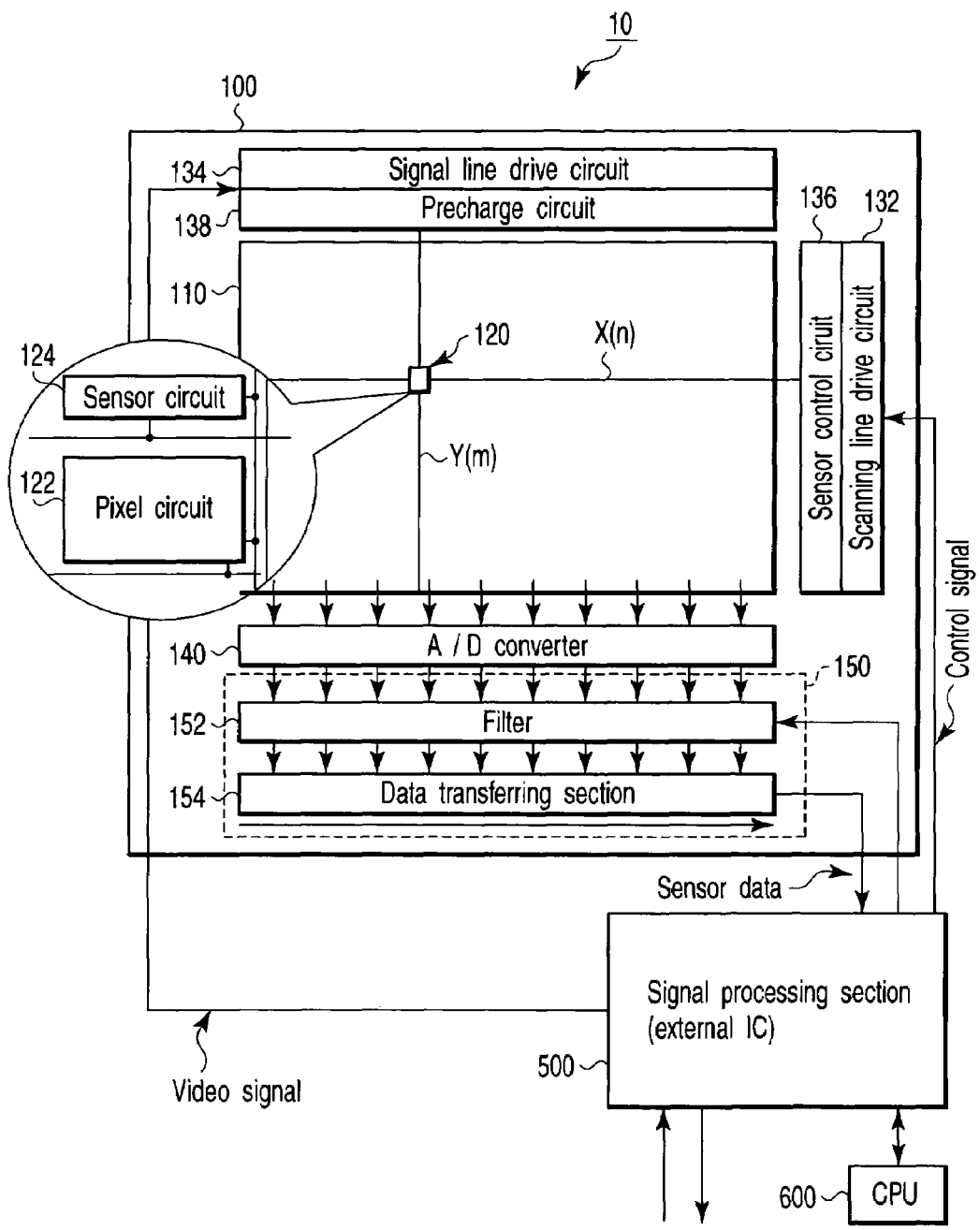
FIG. 1 is a block diagram showing an external IC and an array substrate of a display device according to one embodiment of this invention.

FIG. 1 shows an array substrate 100 of a display device 10 with an optical input function, and a signal processing section 500 which controls the image sensing operation of the array substrate 100 and receives and processes image sensing data.

The signal processing section 500 is formed in an integrated circuit form and a portion thereof is shown in the block form.

As shown in FIG. 1, for example, the display device with the optical input function (or the display device with an image fetching function) 100 is a liquid crystal display driven by a polysilicon thin-film transistor circuit formed on a glass substrate.

The signal processing section 500 is an ASIC formed for exclusive use, digital signal processor DSP, central processing unit CPU or the like. It is used to perform various processes, for example, re-display an image-sensing or photographing image on the display, hold the same in a storage device, or process the photographing image to input coordinate data. However, in this example, the explanation for a portion which controls the display operation by the signal processing section 500 is omitted.

In a display area 110 on the array substrate 100, a plurality of scanning lines X arranged in parallel and a plurality of signal lines Y arranged to intersect with the plurality of scanning lines X are formed. For ease of understanding, in FIG. 1, one scanning line X(n) and one signal line Y(m) are shown as a representative. Pixel circuits 122 used as display means and sensor circuits 124 used as photosensing means are arranged at intersecting portions 120 between the plurality of scanning lines X and the plurality of signal lines Y. In FIG. 1, one pixel circuit 122 and one sensor circuit 124 are shown as a representative.

A drive circuit which drives the pixel circuits 122 via the plurality of scanning lines X and the plurality of signal lines Y is formed in a peripheral portion of the display area 110 of the array substrate 100. The drive circuit includes a scanning line drive circuit 132 which drives a plurality of pixel circuits 122 for each row unit and a signal line drive circuit 134 which supplies image signals to the pixel circuits 122 to be driven.

Further, control means for controlling a plurality of sensor circuits 124 is provided in a peripheral portion of the display area 110 of the array substrate 100. The control means includes a precharge circuit 138 which precharges the sensor circuits 124, a sensor control circuit 136 which specifies the sensor circuits 124 for each row unit, an A/D converter 140 which subjects an output from the sensor circuit 124 to the analog/digital conversion process, and an output processing section 150 which receives digital data output from the A/D converter 140 and outputs corresponding data to the signal processing section 500. The output processing section 150 includes the A/D converter 140, filter 152 and data transferring section 154. The sensor control circuit 136 and precharge circuit 138 configure a sensor drive section. Further, the scanning line drive circuit 132 and signal line drive circuit 134 configure a pixel drive section.

In the array substrate 100, first, information of incident light intensity is converted into an analog signal by use of the sensor circuit 124 provided at the intersecting portion 120 and the analog signal is converted into digital image data by use of the A/D converter 140 provided in the peripheral portion of the array substrate 100. The digital image data is output to the signal processing section 500 by use of the image-sensing data output processing section 150 provided in the peripheral portion of the array substrate 100. The output processing section 150 includes the filter 152 and data transferring section 154. Data output from the A/D converter 140 is subjected to a filtering process by the filter 152 of the output processing section 150 and serially supplied to the signal processing section 500 via the data transferring section 154.

Figure 2:
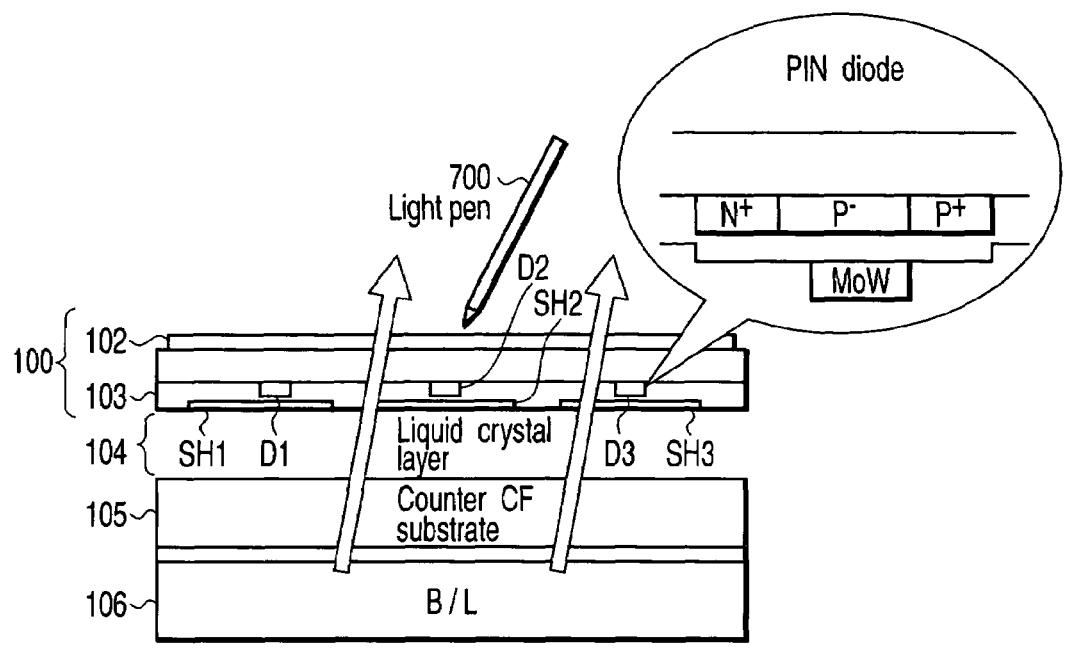
FIG. 2 is a diagram showing an example of the basic configuration of a sensor circuit shown in FIG. 1.
Figure 3:
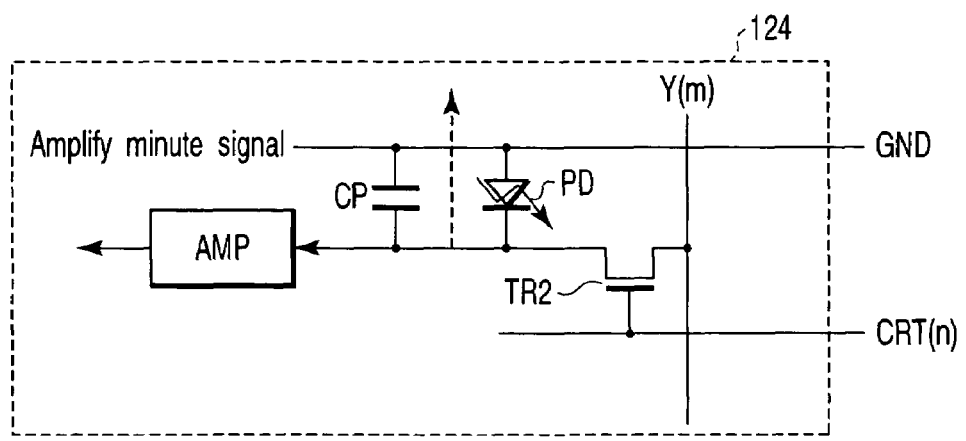
FIG. 3 is a diagram showing an example of the basic circuit configuration of the sensor circuit and pixel circuit shown in FIG. 1.

In FIGS. 2 and 3, an example of the basic configuration of the pixel circuit 122 and sensor circuit 124 shown in FIG. 1 is shown. As shown in FIG. 2, light is incident on the array substrate 100 by use of a light pen 700. A transparent film 102 is coated or attached on or to the outside surface of the array substrate (glass substrate) 100 for glass protection. A plurality of scanning lines X, a plurality of signal lines Y, pixel circuits 122 and sensor circuits 124 which are not shown in FIG. 2 are formed on the inside surface of the array substrate 100 by use of the printing technology and vapor deposition technique.

PIN diodes D1, D2, D3 formed on the inside surface of the array substrate 100 function as photosensitive elements in the sensor circuits 124. The periphery of the PIN diodes D1, D2, D3 is surrounded by an insulating layer 103. Further, on the insulating layer 103, light shielding films SH1, SH2, SH3 are formed in opposition to the PIN diodes D1, D2, D3.

A counter substrate 105 is arranged with a distance from the array substrate 100. The counter substrate 105 has a common electrode (transparent electrode) and is set to face the array substrate 100. A liquid crystal layer 104 is held between the array substrate 100 and the counter substrate 105. A backlight 106 is arranged on the outside surface of the counter substrate 105. The transmission state of light emitted from the backlight 106 is controlled to form an image on the display screen when the light transmits through the counter substrate 105, liquid crystal layer 104 and array substrate 100.

FIG. 3 shows an example of the basic circuit configuration of one of the sensor circuits 124. The source of a switch (thin film transistor) TR2 is connected to a signal line Y(m). The drain of the switch TR2 is connected to the cathode of a photodiode PD and one end of a sensor capacitor CP. The anode of the photodiode PD and the other end of the sensor capacitor CP are connected to an earth line which is set at a preset potential. The gate of the switch TR2 is connected to a reset control line CRT(n).

In the sensor circuit 124, the sensor capacitor CP is precharged in a latter half portion of a particular horizontal blanking period and the readout operation is performed in a former half portion of a particular horizontal blanking period of a next period (after one vertical period). The precharge operation is performed by use of the precharge circuit 138.

If an amount of light illuminated on the photodiode PD after precharging is large, a discharge amount of the sensor capacitor CP becomes large. On the other hand, if an amount of light illuminated on the photodiode PD is small, a discharge amount of the sensor capacitor CP becomes small. In this case, a light shielding treatment is made between the photodiode PD and the backlight. Therefore, a sensor output can be obtained by outputting the voltage of the sensor capacitor PD via an amplifier during the readout period.

Figure 4:
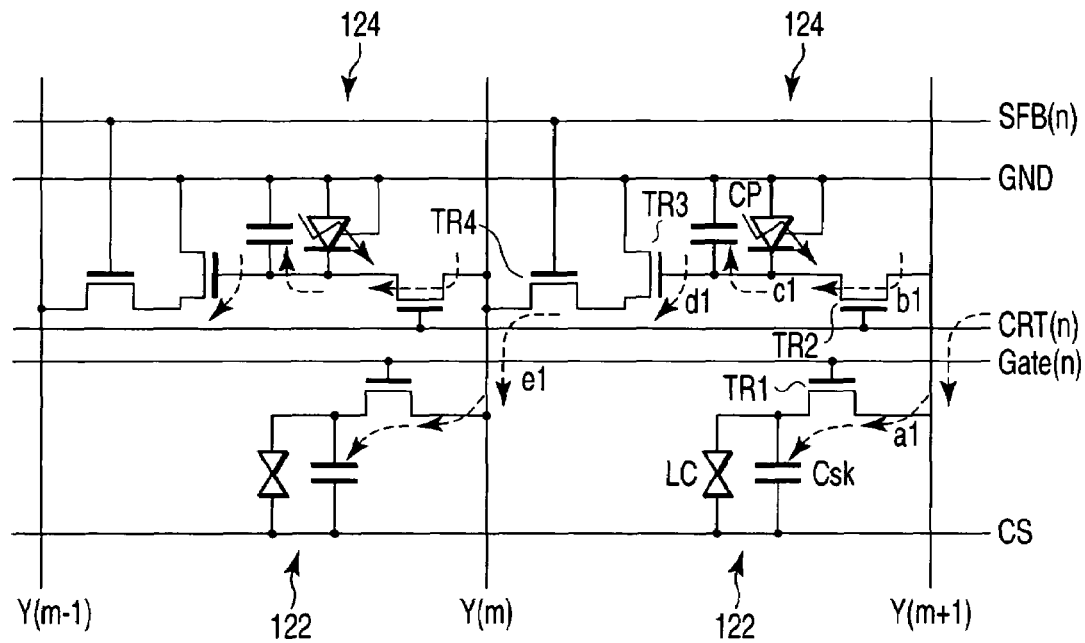
FIG. 4 is a diagram showing an example of the configuration of the sensor circuit and pixel circuit shown in FIG. 1.

FIG. 4 shows an example of the configuration in which a plurality of pixel circuits 122 and sensor circuits 124 are connected. As shown in FIG. 4, a voltage line Cs is used to supply a preset potential to one-side electrodes of an auxiliary capacitor Csk and liquid crystal LC in a preset cycle. A gate line Gate(n) is a gate line (which is a scanning line driven by the scanning line drive circuit 132 ) used to turn ON/OFF the drive transistors TR1 of the pixel circuits 122.

Further, a reset control line CRT(n) is a control signal line driven by the sensor control circuit 136 to turn ON/OFF the switches TR2 which configure the sensor circuits 124.

When the switch TR2 is turned ON, the sensor capacitor CP is precharged. GND indicates a ground line. Further, SFB(n) indicates a sensor output control line (which is driven by the sensor control circuit 136) used to turn ON the thin film transistor TR4 when the potential of the sensor capacitor CP is read out.

The thin film transistor functions as an amplifying element. The photodiode PD responds to light and causes a current corresponding to the sensed light amount to flow. Thus, charges precharged on the sensor capacitor CP can be discharged.

The signal lines Y(m−1), Y(m), Y(m+1) are connected to the signal line drive circuit 134 and A/D converter 140 shown in FIG. 1. Further, the power supply line Cs and gate line Gate(n) are connected to the scanning line drive circuit 132 shown in FIG. 1 and the reset control line CRT(n), ground line GND and sensor control line SFB(n) are connected to the sensor control circuit 136.

Figure 5:
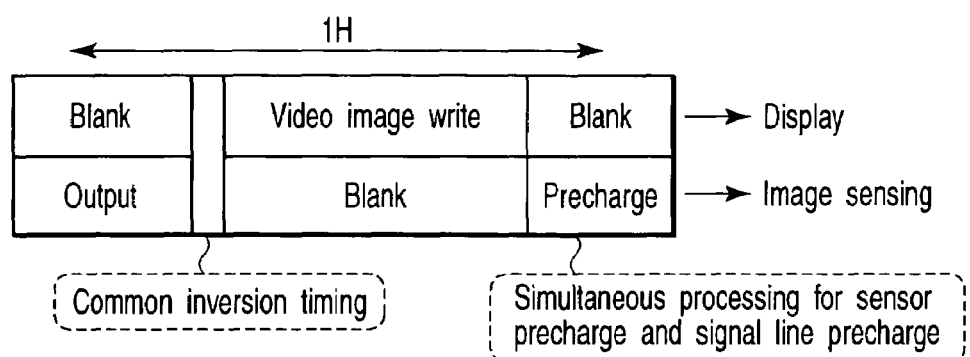
FIG. 5 is a timing chart for illustrating the operation of the sensor circuit and pixel circuit shown in FIG. 4.

FIG. 5 is a timing chart for illustrating the operation of the above circuit. In the above circuit, one particular horizontal period in one vertical period (one frame period) is set as follows. In the pixel circuit 122, one horizontal period (1H) is divided into a first blank period, common inversion blank period, write period and second blank period. In the sensor circuit 124, one horizontal period is divided into an output period, common inversion timing period, blank period and precharge period corresponding to the above four periods. Periods other than the above four periods in one vertical period (one frame period) are a display period in the pixel circuit 122 and an image sensing period in the sensor circuit 124.

In the pixel circuit 122, an image signal is written into the auxiliary capacitor Csk via the signal line Y(m+1) along a path indicated by an arrow a1 during the write period. The liquid crystal LC is driven according to voltage occurring across the capacitor Csk to provide a gradation display.

In the sensor circuit 124, the transistor TR2 is turned ON and the capacitor CP is precharged after the above write period. At this time, the capacitor CP is precharged via the signal line Y(m+1) along paths indicated by arrows b1 and c1. That is, the write period and precharge period are shifted from each other and the signal lines Y are effectively utilized. If a current flows in the photodiode PD in the image sensing period, the precharge voltage varies.

If the transistor TR4 is turned ON in an output period in a next one-frame cycle, the voltage of the sensor capacitor CP is amplified by the transistor TR3 and derived via the signal line Y(m) (paths indicated by arrows d1, e1). The same operation is performed in the pixels and sensor sections of a next horizontal line in a next one-horizontal period. Voltage derived from the sensor capacitor CP varies with time during which the photodiode PD is shielded from light after the precharging operation until the readout operation starts. If the photodiode PD is not light-shielded at all, the readout voltage is set at a sufficiently low level, and if the light-shielding time is long, a high voltage is attained. As a result, it is determined whether or not a signal is input by use of the light pen 700.

Figure 6:
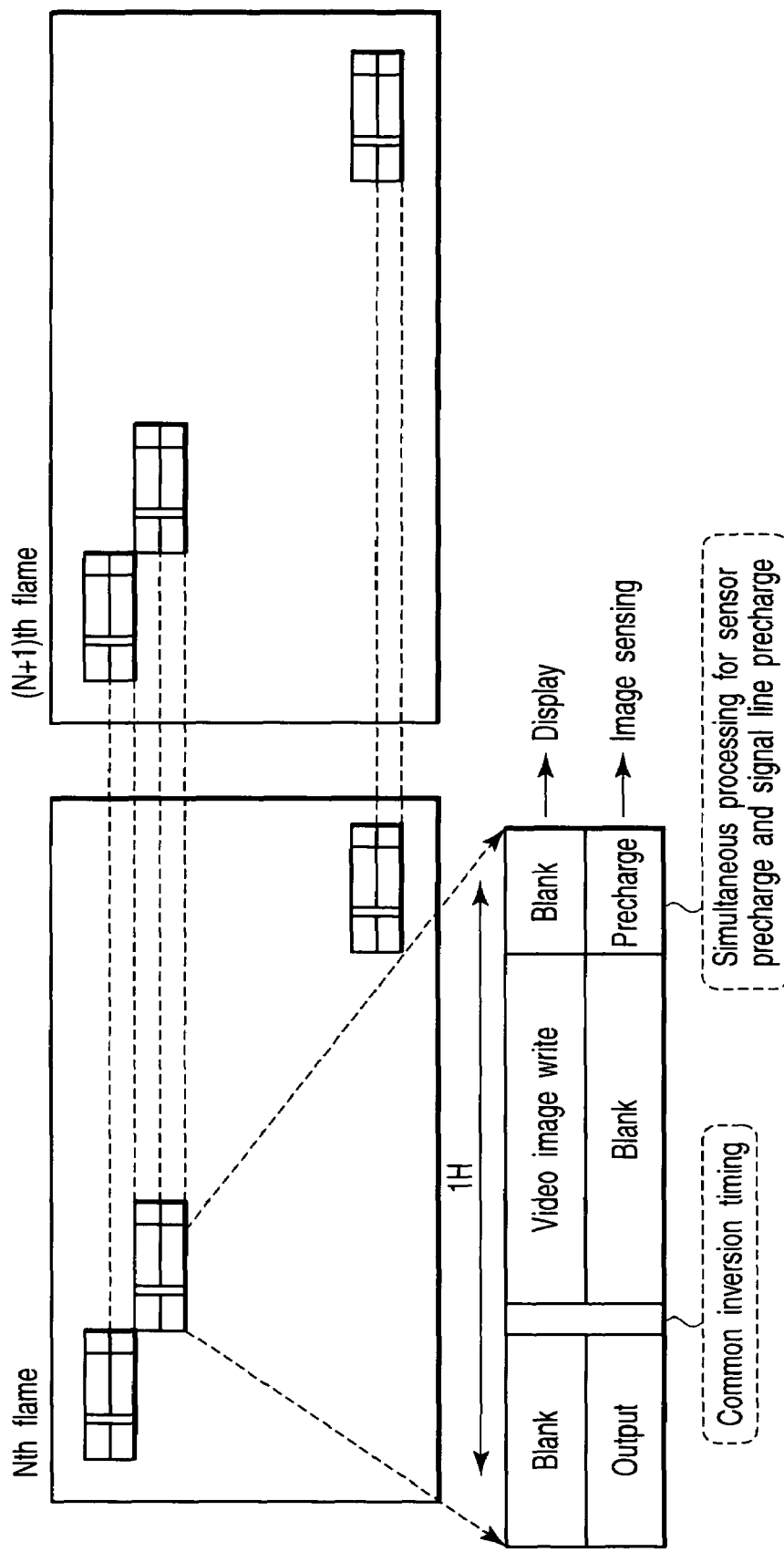
FIG. 6 is a diagram for illustrating an example of the operation of the circuit shown in FIG. 4 for each frame unit.

FIG. 6 is an explanatory diagram showing the above operation for each frame unit. In FIG. 6, for example, Nth and (N+1)th frames are shown. The signal processing operation explained with reference to FIG. 5 is performed in a particular horizontal period of the Nth frame and an image is displayed by use of the pixel circuits 122 and light is sensed by the sensor circuits 124 in a period to a particular horizontal period of the (N+1)th frame.

Next, the filtering process for an output of the sensor circuit 124 is explained. As shown in FIG. 1, when a certain scanning line X(n) is activated, analog signals of the pixels of one row output from the sensor circuits 124 are input to the A/D converter 140. An output of the A/D converter 140 is input to the output processing section 150 as digital image data.

Figure 7:
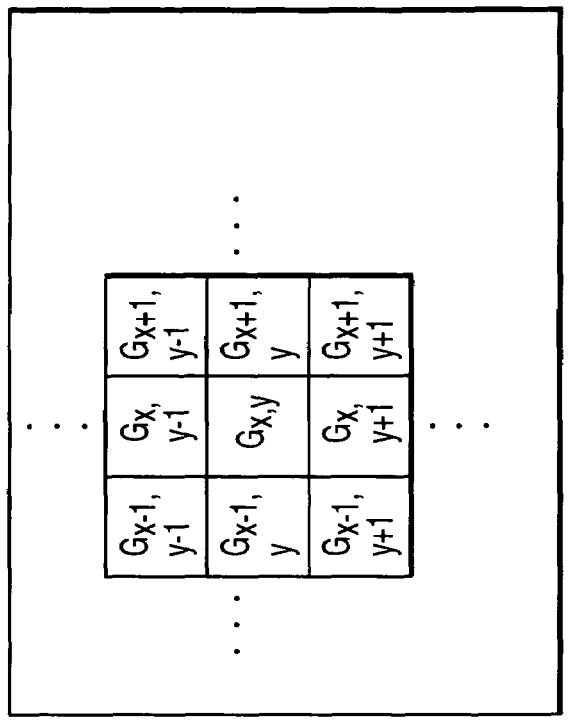
FIG. 7 is a diagram for illustrating an example of the filtering operation of processing an output of the sensor circuit shown in FIG. 1.
Figure 7:
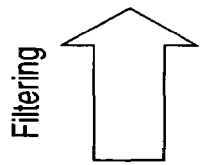
Figure 7:
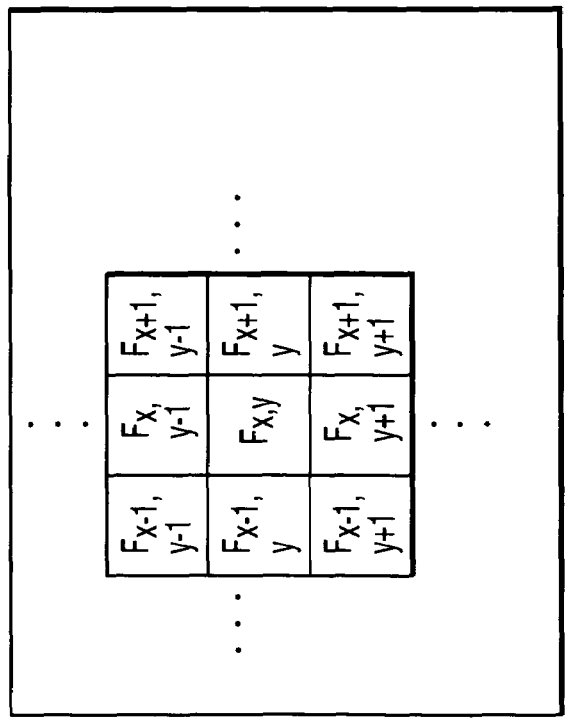

FIG. 7 illustrates the filtering operation which is one example of the operation of the device of this invention. FIG. 7 shows a rank order filtering process for the neighboring 3×3 pixels in which nine gradation values in total (on the left side in FIG. 7) including a gradation value F(x, y) of a target pixel lying in a position (x, y) and gradation values F(x−1, y−1), F(x, y−1), ... of pixels which are adjacent to the target pixel in the upper, lower, right and left directions are rearranged in an ascending or descending order and, for example, a gradation value of an intermediate order or rth order is used as a new gradation value G(x, y) (on the right side in FIG. 7) of the target pixel. A circuit which realizes the above process is a circuit explained below.

FIG. 8 shows an example of the circuit configuration which processes an output signal from the sensor circuit 124. When a certain scanning line X(n) is activated, the sensor circuits 124 connected to the scanning line X(n) output the intensities of sensed light as analog signals to the A/D converter 140. The A/D converter 140 includes A/D conversion circuits ADC and delay flip-flops D-FF1 which respectively correspond to the signal lines. Each of the A/D conversion circuits ADC converts the analog signal input from the sensor circuit 124 to digital data. The delay flip-flop D-FF1 fetches an output of the A/D conversion circuit ADC at preset timing once in one horizontal period.

In the present embodiment, for example, each A/D conversion circuit ADC copes with one-bit data and supplies one-bit pixel data of each of the pixels of one row to a corresponding one of the delay flip-flops D-FF1.

Figure 9:
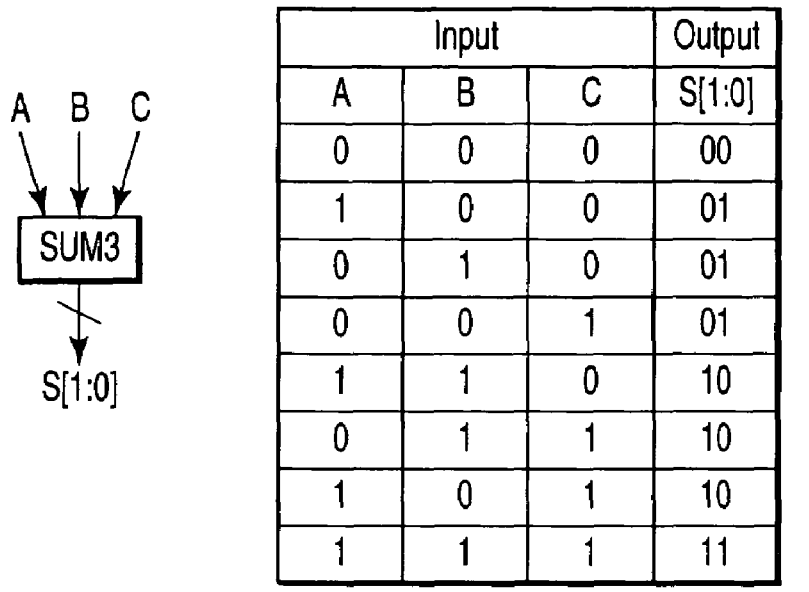
FIG. 9 is a diagram for illustrating an input/output example of an adder circuit shown in FIG. 8.

Each of adder circuits SUM3 is a circuit which outputs the sum of input data items when one-bit pixel data items of three pixels which are adjacent in the row direction are input thereto. The adder circuit SUM3 generates an output corresponding to a value input as shown in the truth table of FIG. 9.

An output of each adder circuit SUM3 is input to a series circuit of three delay flip-flops D-FF2. The delay flip-flops D-FF2 transfer an output of the adder circuit SUM3 at a preset timing for each one-horizontal period. Outputs of three rows of the adder circuit SUM3 can be held by the three delay flip-flops D-FF2. Two adders PL1, PL2 derive the sum of data items of three rows and the sum of the data items are fetched into a delay flip-flop D-FF3 at a preset timing for each horizontal period.

From the above description, it is understood that gradation values of three stages of three pixels which are adjacent in the row direction, that is, the sum of gradation values of 3×3 pixels in the row and column directions is fetched into the delay flip-flop D-FF3 for each horizontal period.

Figure 10:
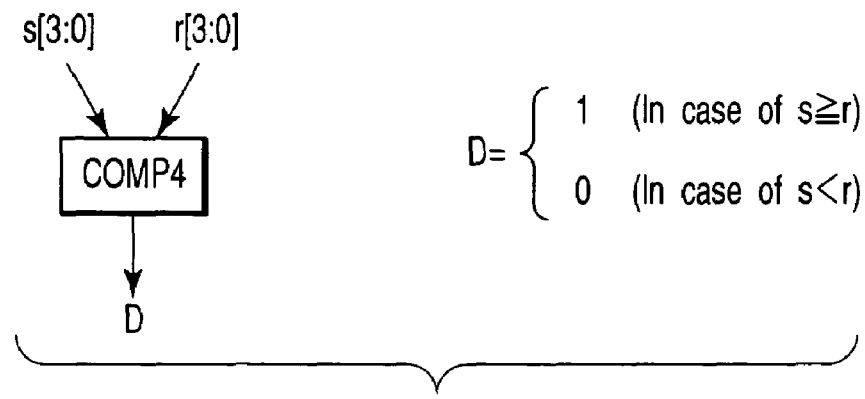
FIG. 10 is a diagram for illustrating an input/output example of a comparator shown in FIG. 8.

An output from the delay flip-flop D-FF3 is input to a comparator COMP4. The comparator COMP4 is a 4-bit comparator which compares a value of the delay flip-flop D-FF3 with a specified rank value r, and the input/output relation thereof is shown in FIG. 10. The gradation value of a target pixel can be replaced by "1" when the sum of the gradation values of the 3×3 pixels is larger than or equal to the rank value r and it can be replaced by "0" when the sum is smaller than the rank value.

As a result, in the filter 152, for example, the gradation value F(x, y) of a target pixel shown in FIG. 7 is converted into a gradation value which is the rth smallest or largest gradation value when the gradation values of the neighboring 3×3 pixels are rearranged in an ascending or descending order. That is, it means that the rank order filtering process for the rank r is performed. When image data is one bit, $G_{x,y}$ is expressed as follows.

$$G_{x,y} = \begin{cases} 1 & \left(\text{in the case of } \sum_{i,j=-1,0,1} F_{x+i,y+j} \geq r\right) \\ 0 & \left(\text{in the case of } \sum_{i,j=-1,0,1} F_{x+i,y+j} < r\right) \end{cases} \quad (1)$$

Thus, in the filter 152, the gradation value F(x, y) of the target pixel can be replaced by "1" when the total sum of the values of neighboring pixels is larger than or equal to the rank value r and can be replaced by "0" when the total sum of the values is smaller than the rank value r.

An output line of the comparator COMP4 is connected to the data transferring section 154. The data transferring section 154 includes a plurality of delay flip-flops D-FF4 connected to the respective filter circuits via switches HSW. The delay flip-flops D-FF4 configure a shift register which serially outputs data to the exterior.

First, when the switches HSW are set into the ON state and switches TSK are set into the OFF state at a preset timing for each horizontal period, and a transfer clock rises (or falls) once during the above period of time. Thus, data items of the pixels of one row are held in the delay flip-flops D-FF4. After this, the switches TSK are set into the ON state and the switches HSW are set into the OFF state, and in this state, data is sequentially transferred in response to a transfer clock.

FIGS. 11A to 11D show one example of the results of the filtering process for the neighboring 3×3 pixels by the filter 152. An image shown in FIG. 11A which is an image obtained when the filtering process is not performed is binary image data output to the signal processing section 500 when light of the light pen 700 or the like is illuminated on the array substrate 100 to input coordinate data. A white circular portion on the left side of the image corresponds to an indicated portion of the light pen 700 and a white line extending in a vertical direction on the right side of the image corresponds to a line-form defect occurring by the defect of the A/D conversion circuit ADC.

Figure 11A:
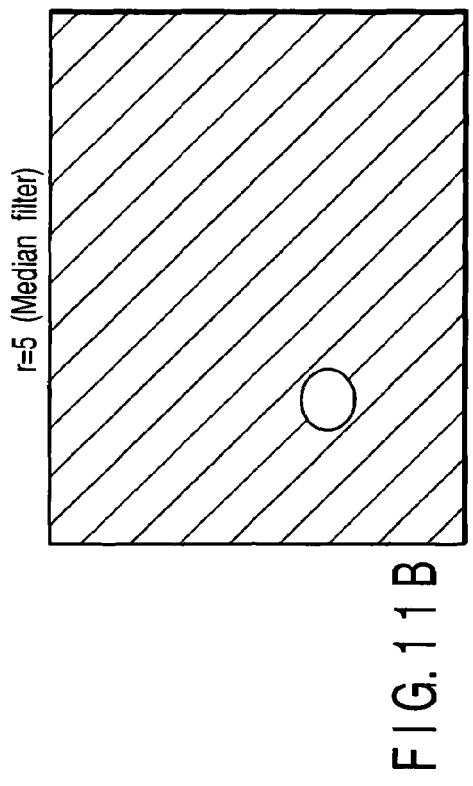
FIGS. 11A to 11D are explanatory views showing one example of the results of the filtering process by the circuit shown in FIG. 8.
Figure 11B:
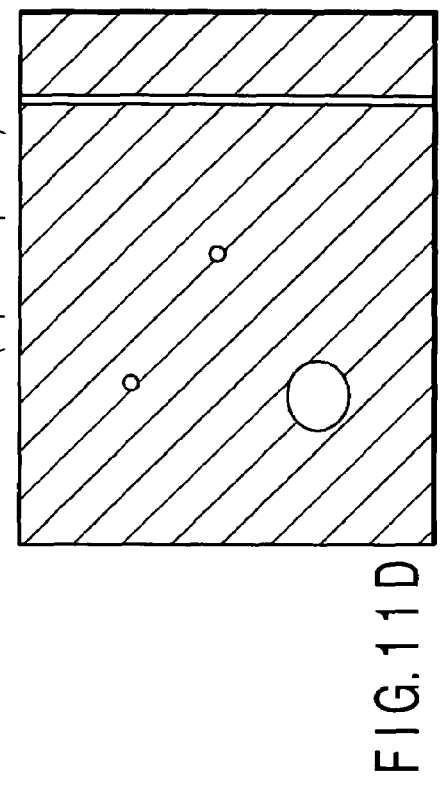
Figure 11C:
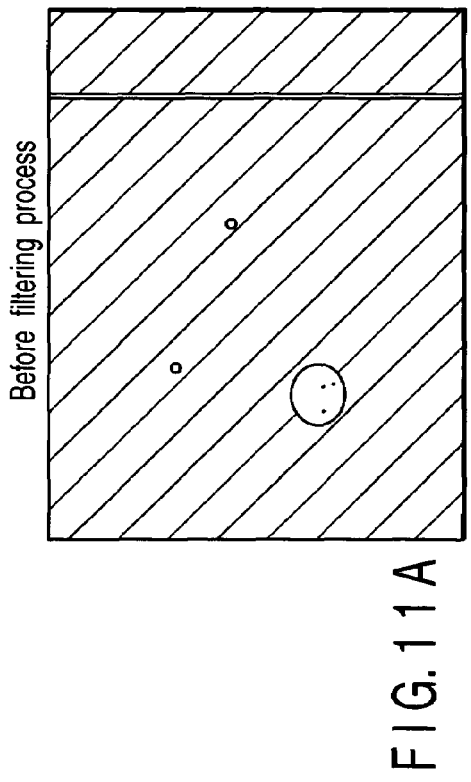
Figure 11D:
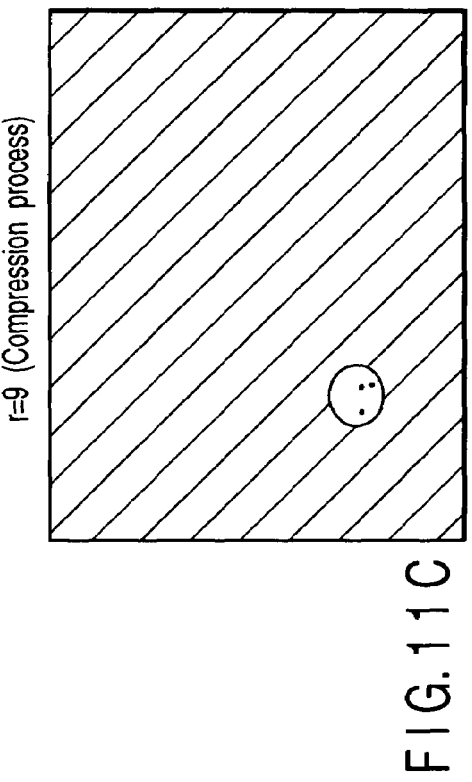

In FIGS. 11B, 11C and 11D, one example of results obtained when values of the rank value r of the rank order filter are different is shown. FIG. 11B indicates the result obtained when the rank r is set to "5". This indicates a case wherein the rank order filter is a median filter used in a particular case and dot-form defects and line-form defects are compensated for. FIG. 11C indicates the result obtained when the rank r is set to "9". In this case, the portion indicated by the light pen 700 and the white area of the line-form defect are compressed (compression process). FIG. 11D indicates the result obtained when the rank r is set to "1". In this case, the portion indicated by the light pen 700 and the white area of the line-form defect are expanded (expansion process).

As described above, the effect that the dot-form defects and line-form defects are compensated for according to the rank value r set by the rank order filter circuit and the white area is expanded or compressed can be attained.

The rank value r of the rank order filter circuit can be determined by the signal processing circuit 500 or a circuit on the array substrate 100. Further, the rank value may be fixedly set or controlled and dynamically changed by use of the signal processing circuit 500 or a circuit on the array substrate 100.

Since the rank order filter circuit is formed on the array substrate 100, a rise in the cost of the signal processing section 500 can be suppressed without increasing the circuit scale thereof. Further, it becomes unnecessary to select and use display devices having image fetching functions which are free from defects and the manufacturing yield thereof is enhanced. Since the rank order filter circuit is formed on the array substrate 100, image-sensed data can be efficiently fetched.

Further, since the rank order filter circuit is formed for each signal line, it becomes possible to perform the rank order filter processes for the pixels of one row in parallel. In this case, the filter process can be performed by use of clocks of one horizontal period and a high-speed clock is not required.

Figure 12:
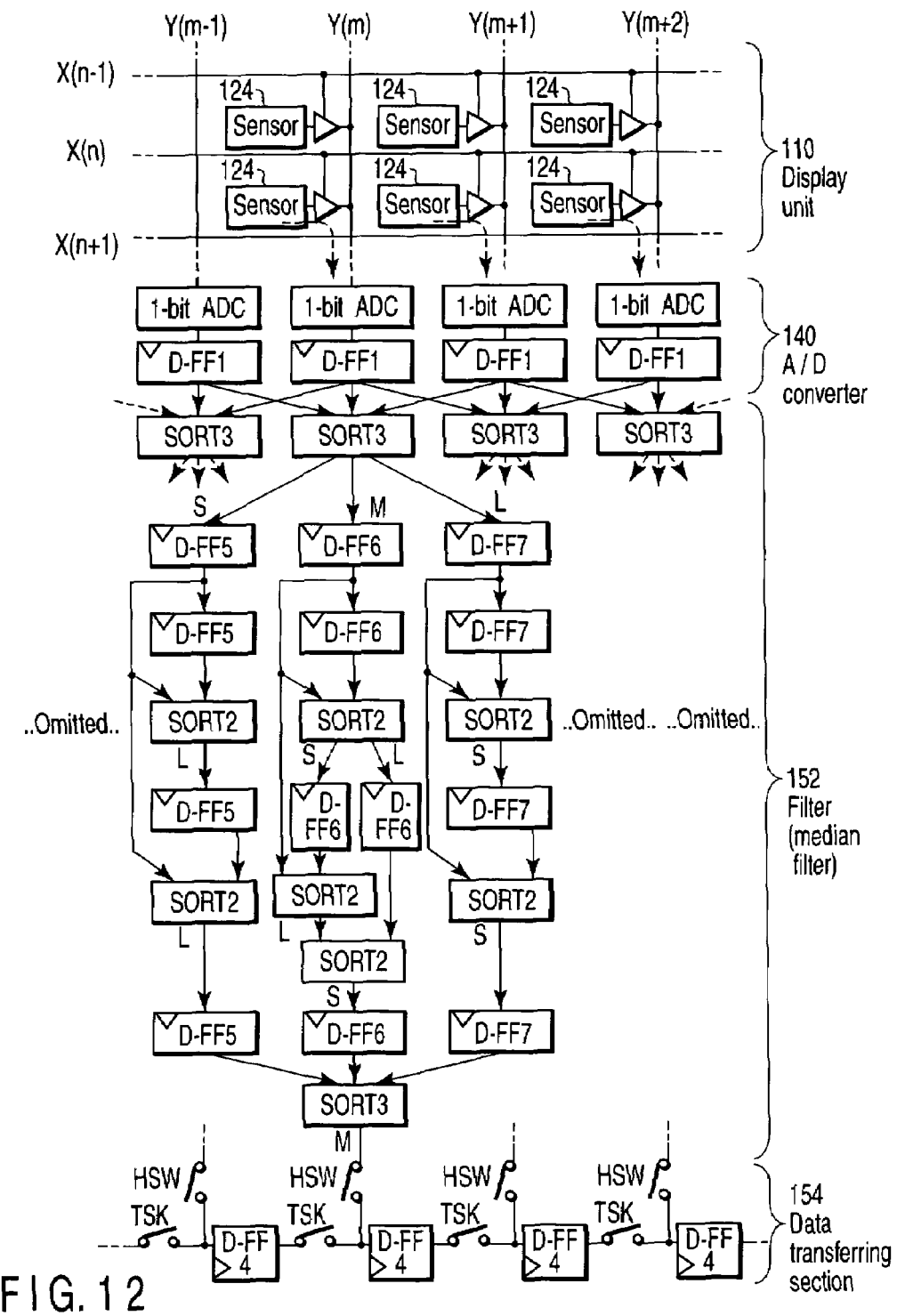
FIG. 12 is a diagram showing another example of the circuit configuration which processes an output of the sensor circuit of a display device having an optical input function according to this invention.

Next, a second embodiment of this invention is explained. In a circuit shown in FIG. 12, a median filter circuit in a particular case of a rank order filter circuit (in a case wherein the rank value r is set to "5" in the rank order filter circuit for the neighboring 3×3 pixels) is used as a filter 152. In this case, the same operation can be performed by changing the rank value r in the rank order filter circuit described before, but it can be attained by use of a simplified circuit configuration. FIG. 12 shows an example of the circuit configuration.

Figure 13A:
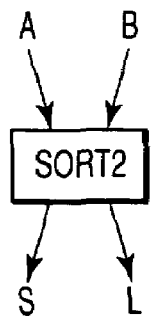
FIGS. 13A, 13B are diagrams showing input/output examples of a sorting circuit shown in FIG. 12.
Figure 13B:
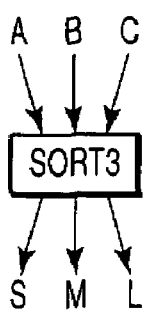

Only the circuit portion of the filter 152 shown in FIG. 12 is different from that of FIG. 8. Each of sort circuits SORT3 is a combinational circuit which sorts three input values in an ascending order and outputs the same and each of sort circuits SORT2 is a combinational circuit which sorts two input values in an ascending order and outputs the same. The sort circuit SORT3 and sort circuit SORT2 output signals in response to inputs as shown in the truth tables of FIGS. 13A and 13B.

The minimum value, intermediate value and maximum value of the values sorted by the sort circuit SORT3 or SORT2 are output as shown in the nodes S, M and L. Four-stage delay flip-flops D-FF5 fetch the minimum gradation values of three rows among gradation values of the adjacent pixels of three columns and output the maximum gradation value among the gradation values of the three rows to the final stage. Likewise, delay flip-flops D-FF6 fetch intermediate gradation values of three rows among gradation values of the pixels of three columns and output the intermediate gradation value among the gradation values of the three rows to the final stage. Further, delay flip-flops D-FF7 fetch the maximum gradation values of three rows among gradation values of the pixels of three columns and output the minimum gradation value among the gradation values of the three rows to the final stage.

Finally, the final-stage outputs of the delay flip-flops D-FF5, D-FF6 and D-FF7 are input to the sort circuit SORT3 and the gradation value of the intermediate order is output to the data transferring section 154. As a result, the gradation value of a pixel whose rank value r is set at "5" among the gradation values of the 3×3 pixels near the target pixel is output to the data transferring section 154. That is, in the filter 152, a median filter process is performed.

An image shown in FIG. 11B can be obtained by performing the filter process in the median filter circuit. Further, like the case wherein the rank order filter circuit is used, the circuit scale of the signal processing section 500 is not increased and a rise in the cost thereof can be suppressed. Further, it becomes unnecessary to select a display device having the image fetching function which is free from defects and the manufacturing yield thereof is enhanced. Further, image-sensed data can be efficiently fetched by forming the median filter circuit on the array substrate.

Since the median filter circuit is formed for each signal line, it becomes possible to perform a parallel process by use of a clock of one horizontal period and a high-speed clock is not required.

Figure 14:
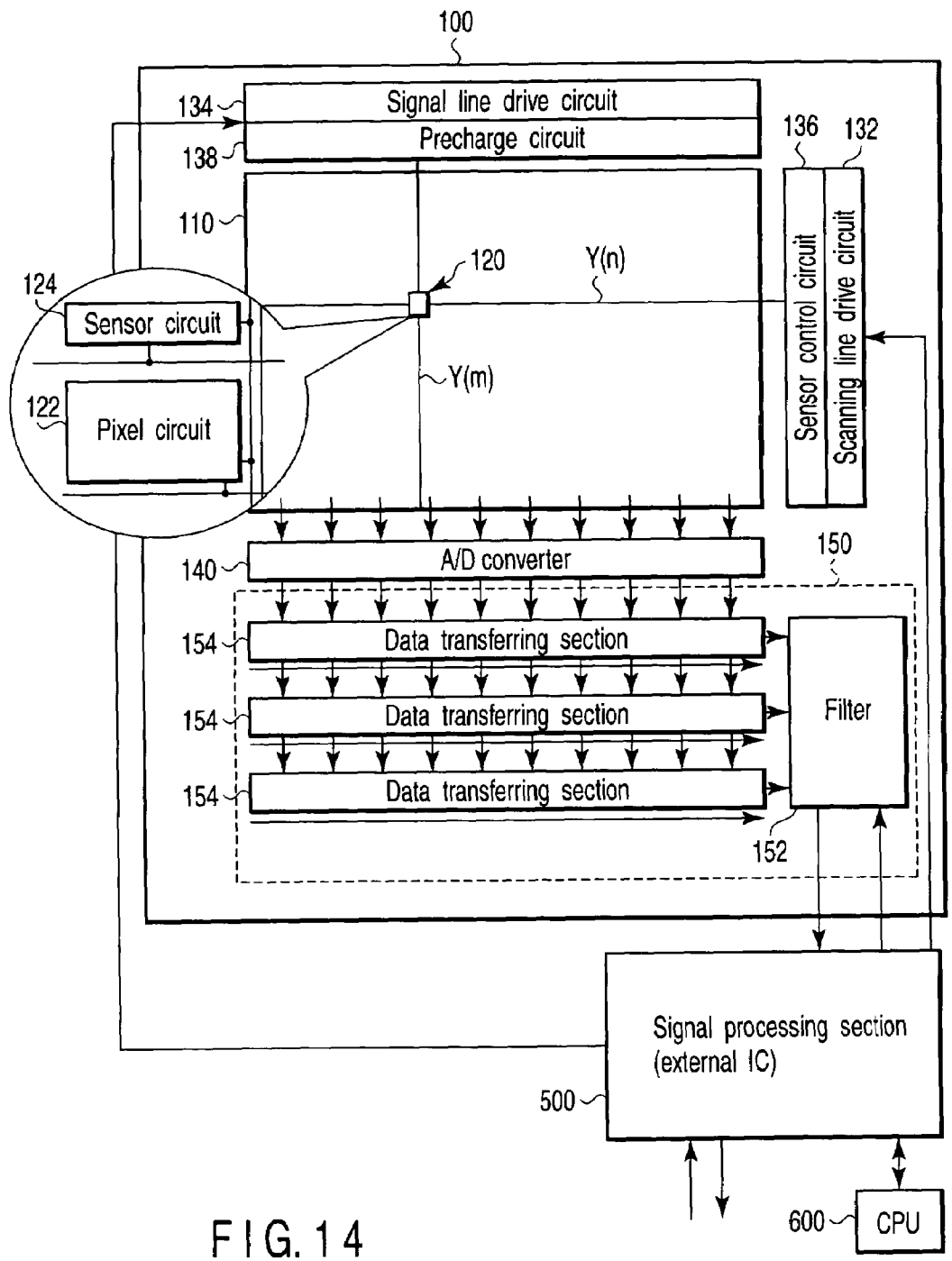
FIG. 14 is a block diagram showing another example of the configuration of an external IC and an array substrate of a display device having an optical input function according to this invention.

Next, a third embodiment of this invention is explained. FIG. 14 is a block diagram showing one example of the embodiment in which the filter process is serially performed.

In the present embodiment, an output processing section 150 includes a data transferring section 154 which serially outputs data of pixels of three rows. Analog signals output from sensor circuits 124 are converted into digital image data by an A/D converter 140 and input to the output processing section 150. In the output processing section 150, digital image data transferred by the data transferring section 154 of three rows are serially subjected to a filter process in the filter 152 connected to the final stage of the output processing section 150 and output to the exterior.

Figure 15:
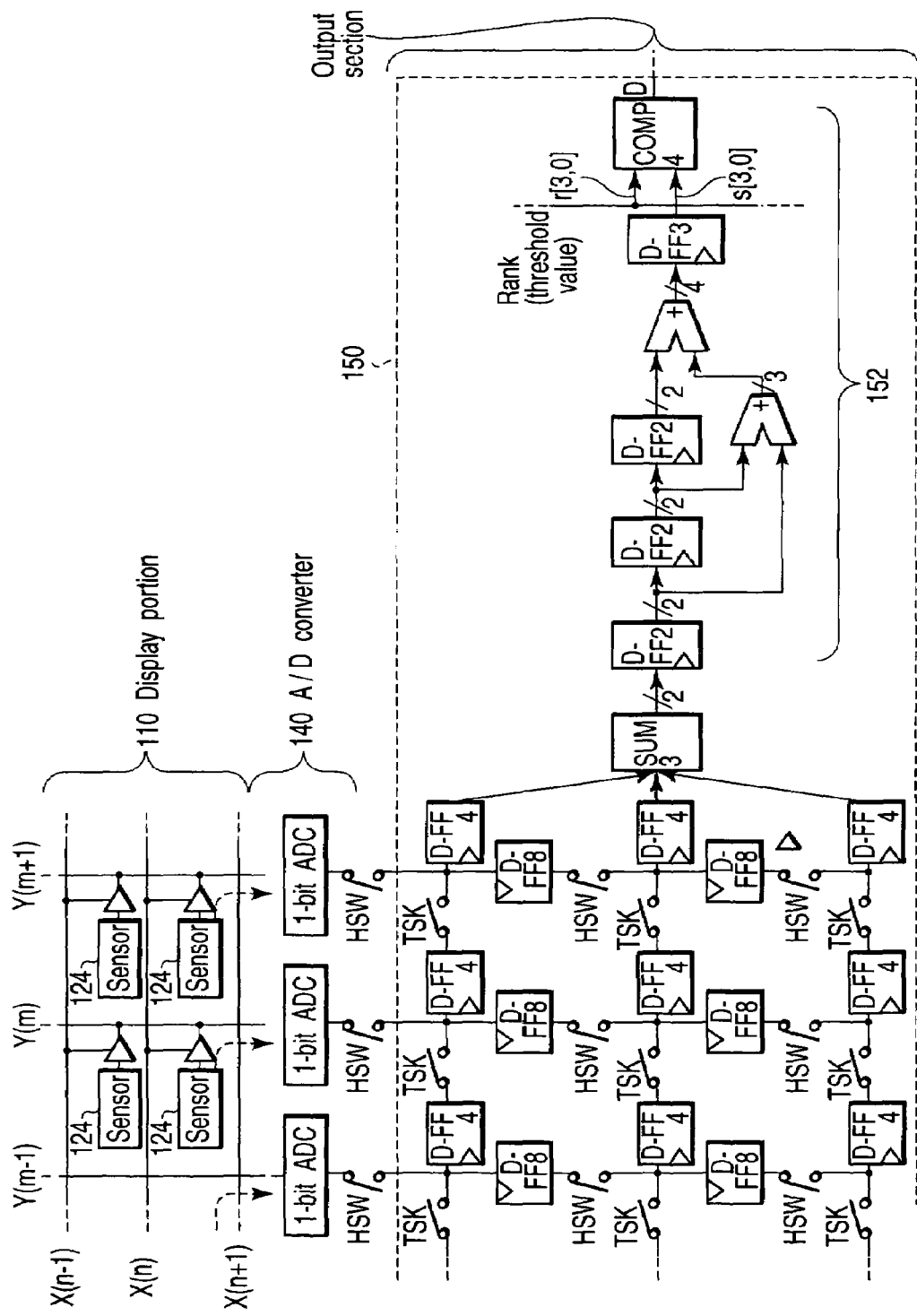
FIG. 15 is a diagram showing an example of the circuit configuration which processes an output of the sensor circuit shown in FIG. 14.

FIG. 15 shows an example of the circuit configuration when a rank order filter is used as the filter 152, for example. Delay flip-flops D-FF4 configure a shift register which transfers data in the right direction in the drawing in response to a transfer clock when switches TSK are set in the ON state. Further, delay flip-flops D-FF8 configure a shift register which transfers data in the downward direction in the drawing in response to a transfer clock while switches HSW are set in the ON state.

First, the switches HSW are set in the ON state and the switches TSK are set in the OFF state at a preset timing for each one-horizontal period and the vertical transfer clock rises (falls) once during the above period of time. As a result, data of pixels of one row is transferred in the downward direction and held by the delay flip-flops D-FF8. At the same time, the horizontal transfer clock rises (or falls) once and data of pixels of one row is held in the delay flip-flops D-FF4. After this, the switches TSK are set into the ON state and the switches HSW are set into the OFF state, and therefore, data is transferred in the right direction in the drawing in response to the horizontal transfer clock.

That is, data of three rows is sequentially transferred by use of the delay flip-flops D-FF4 during one-horizontal period. Therefore, the serial process is performed by connecting a rank order filter circuit to the final stage of the delay flip-flops D-FF4.

As described above, in the case of the circuit configuration which serially performs the filter process, images after the filter process shown in FIGS. 11B to 11D can be obtained according to the setting values of the rank value r of the rank order filter. Further, in addition to the same effect as that obtained when the filter processes are performed in parallel as shown in FIG. 8, the occupied area of the rank order filter circuit can be made smaller in comparison with a case wherein the parallel process is performed if the circuit is configured to serially perform the filter processes.

Image data of three rows can be output as it is to the signal processing section 500 as three signals. In this case, it is necessary to form the rank order filter circuit in the signal processing section 500. However, since the line memory is not required, almost no influence is given to the circuit scale and cost of the signal processing section 500. Further, like the case of the parallel process, the rank value r of the rank order filter circuit may be determined by use of the signal processing circuit 500 or a circuit on the array substrate 100. The rank value r can be fixedly set or dynamically changed.

Figure 16:
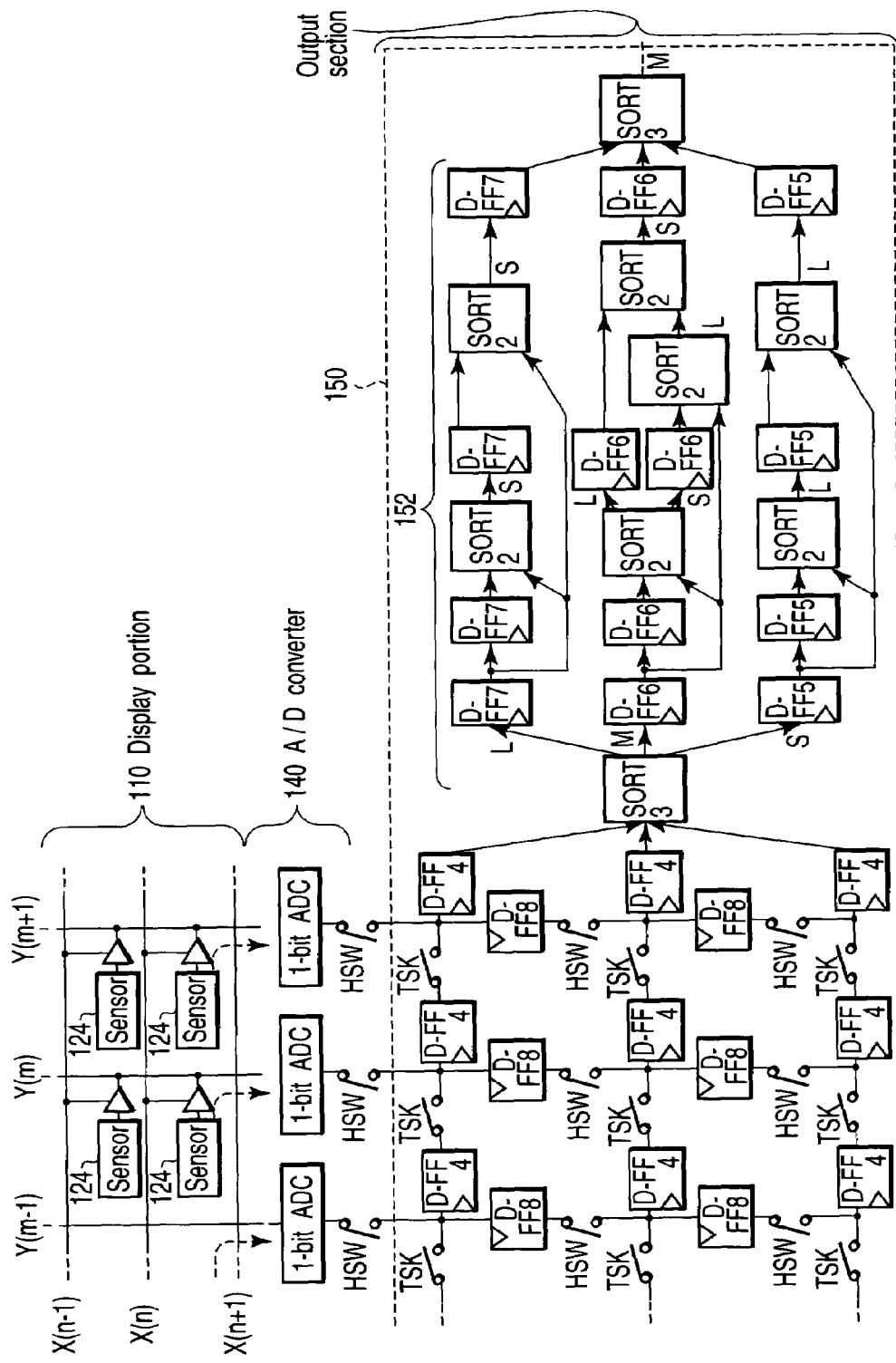
FIG. 16 is a diagram showing another example of the circuit configuration which processes an output of the sensor circuit shown in FIG. 14.

A case wherein the median filter circuit is used as the filter circuit is shown in FIG. 16. Also, in this case, the same effect as that shown in FIG. 15 can be attained.

This invention is not limited to the above embodiments and can be variously modified and embodied without departing from the technical scope thereof at the embodying stage. Further, various inventions can be made by adequately combining a plurality of constituents disclosed in the above embodiments. For example, some constituents may be omitted from all of the constituents disclosed in the above embodiments. Further, the constituents disclosed over the different embodiments may be adequately combined.

Figure 17:
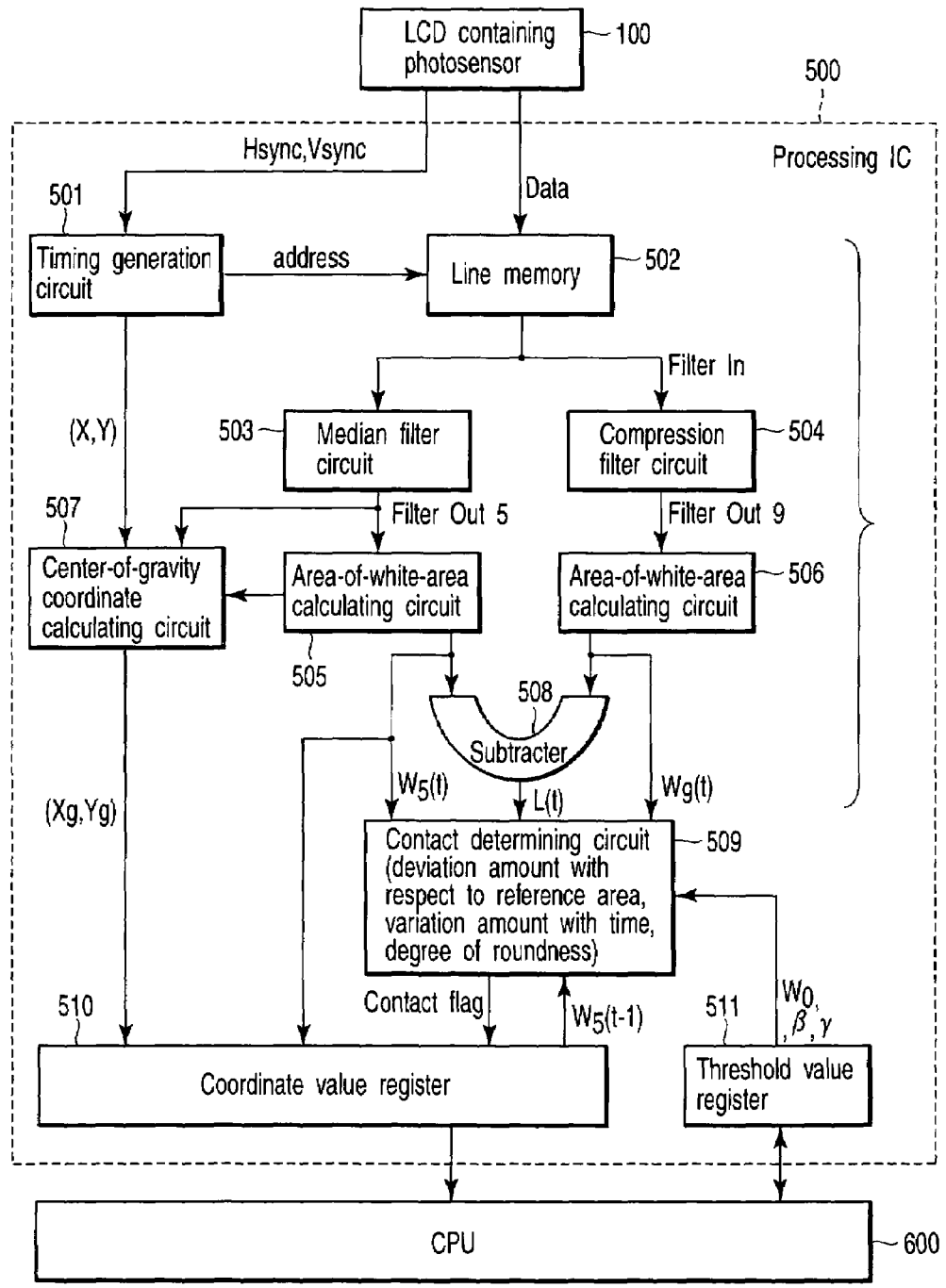
FIG. 17 is a block diagram showing the basic configuration of an coordinate input and image input section which is a main portion of the display device having the optical input function according to this invention.

FIG. 17 is a block diagram for illustrating a signal processing section which can correctly determine input/non-input of light from a light source. The signal processing section 500 has the basic configuration of a coordinate input and image input section which is used as a main portion of the display device having the optical input function according to one embodiment of this invention.

In FIG. 17, a reference symbol 10 indicates a liquid crystal display device containing the pixels and photosensors as explained before. An image can be displayed and optical input can be made on an array substrate 100. A reference symbol 500 indicates a signal processing section formed in an integrated circuit form and the block of part of the section is shown. That is, the block of part of the section which fetches an output from the sensor circuit as explained before is shown.

A vertical sync. signal Vsync, horizontal sync. signal Hsync and image data Data in synchronism with the sync. signal are output from the array substrate 100. The vertical sync. signal Vsync and horizontal sync. signal Hsync are input to a timing generation circuit 501 in the signal processing section 500 and image data Data is input to a line memory 502. The timing generation circuit 501 supplies a write/read-out address to the line memory 502 in synchronism with the sync. signal Hsync.

An output of the line memory 502 is supplied to a median filter 503 and compression filter 504. The median filter 503 performs an unnecessary portion eliminating process in the display screen by use of data of a preset area (for example, the 3×3 pixels) and an area-of-white-area calculating circuit 505 performs a process of deriving the remaining area by use of the filter output. That is, the median filter 503 eliminates a data missing portion based on pixel defects and noise lying in a preset area and an output thereof is input to the area-of-white-area calculating circuit 505 which in turn derives the area W5($t$) of the remaining area.

The compression filter 504 performs the compression process by use of data of a preset area (for example, the 3×3 pixels) and an area-of-white-area calculating circuit 506 derives an area W9($t$) which is left behind after the compression process. Further, a center-of-gravity coordinate calculating circuit 507 can derive the center-of-gravity coordinate (Xg, Yg) of an area to which light is applied by use of the output from the median filter, the area W5($t$) and coordinate information (x, y).

The calculation of the area W can be made by, for example, counting a number of pixels in a present areas, where the levels of pixels are larger than or equal to the white-level, after the output values of pixels from the filter are checked.

After the output values of pixels from the filter are checked, the gravity coordinate Xg can be made dividing the accumulated value by the area W, the accumulated value is obtained by the values of X are accumulated by the accumulater, the values of X are obtained from the coordinate information when the output values of pixels are the white-level.

Information items indicating the areas W5(*t*) and W9(*t*) are input to a subtracter 508 and contact determination circuit 509. The information indicating the area W5(*t*) is also input to a coordinate value register 510. A difference L(*t*) between the areas W5(*t*) and W9(*t*) is obtained from the subtracter 508. The difference corresponds to the length of the periphery, that is, the peripheral length of the light receiving area. The peripheral length L(*t*) is input to the contact determination circuit 509.

The contact determination circuit 509 determines whether the light pen (light source) is set in a correct input state with respect to the display screen or not. If the light pen is set in the correct input state, it outputs and supplies a contact flag to the coordinate value register 510.

A reference symbol 511 indicates a threshold value register which holds parameters (area reference value W0, deviation amount threshold value α, time variation threshold value β and degree-of-roundness threshold value γ) supplied from a central processing unit (CPU) 600. The above parameters are input to the contact determination circuit 509. Further, area information W5(*t*−1) of a directly preceding frame which is held in the coordinate value register 510 is also input to the contact determination circuit 509.

As will be described later, the contact determination circuit 509 performs the operating process by use of the parameters and input information to output the contact flag.

That is, the contact determination circuit 509 is a circuit which determines whether or not the light source is set in contact with the display screen by uses of the areas W5(*t*), W9(*t*) and peripheral length L(*t*) obtained by the operating process for image data from the LCD section, the area W5(*t*−1) of a directly preceding frame stored in the coordinate value register 511 and four parameters of the threshold value register. Further, the result is written into the coordinate value register 510 as a contact flag.

The center-of-gravity coordinate (Xg, Yg) is also input to the coordinate value register 510. Further, area information W5(*t*−1) of the directly preceding frame held in the coordinate value register 510 is input to the contact determination circuit 509.

The signal processing section 500 which is formed in an integrated circuit form is a processing IC such as DSP or ASIC which derives area information and a contact flag indicating whether or not the light source is set in the contact state and stores the contact flag into the coordinate value register 511.

The CPU 600 can read out data of the coordinate value register 510 to perform various processes. The CPU 600 adjusts the contact determining operation by reading or writing data with respect to the register.

In this example, it is assumed that the gradation of image data from the LCD section is set to one bit (two gradation levels). In the case of multi-gradation data, an area can be calculated by an adequate binary coding process or gradation weighting process, but the calculation process is not explained here. The peripheral length L(*t*) is calculated by the following equation (2).

$$L(t) = W_5(t) - W_9(t) \quad (2)$$

The peripheral length L(*t*) corresponds to the length of the periphery of the light receiving area.

Next, the filter output and operation output obtained when the light pen 700 is set closer to or separated away from the display area 110 of the LCD section are explained with reference to FIGS. 18A, 18B, 18C. It is now assumed as shown in FIG. 18C that the light pen 700 is set in states (1) to (6) with time with respect to the display area 110 of the LCD section. For example, the light pen 700 utilizes a light emission diode (LED) as a light source.

When the light pen 700 is set in the states (1) to (6) as shown in FIG. 18C, that is, when the tip end of the light pen 700 is first set in contact with the display area and then separated away from the display area while the light pen is illuminating the display area 110, an image as shown in FIG. 18B is obtained as image data, for example.

That is, a white area detected with respect to the black background is sequentially changed from the state (1) to the state (6). In the case of the state (5), the white area makes a clean circle and the area thereof is set within a preset range. At this time, if variations in the areas W5(*t*), W9(*t*) and L(*t*) explained in FIG. 17 are observed, the areas vary as shown in FIG. 18A. In the case of the state (5), all of the three factors become small and a preset area W0 (=230) is obtained. Therefore, a contact flag is output when the above value is obtained. FIG. 18A is a graph showing variations in typical image data Data, areas W5(*t*) and W9(*t*) and peripheral length L(*t*) with time.

More specifically, numbers (1) to (6) are attached to indicate approximate times at which image data items are obtained and rough states in which the pen 700 is set. The numbers (1) to (6) correspond to the states (1) to (6) shown in FIGS. 18B, 18C. In the states (1) to (5), the tip end of the pen is gradually set closer to the display screen, and in the states (5) to (6), the tip end of the pen is gradually separated away from the display screen.

In the state (1), the photosensor starts to respond to incident light from the pen, and some sensor circuits respond to light and other sensor circuits do not respond to light according to variations in the sensor elements and readout circuits. In the state (2), responding areas are provided in the central portion and peripheral portion for the angular distribution of radiation angles of the LED and the complex shapes thereof are shown. In the state (3), the responding areas in the central portion and peripheral portion get closer to each other and are connected together. In a state approximately equal to the above state, the area W5(*t*) becomes maximum. In the state (4), the spread of light from the pen 700 is narrowed and the area of the responding area becomes smaller, but the pen is not set in contact with the display screen yet. In the state (5), the pen 700 is set in the contact state and the area W5(*t*) becomes minimum. In the state (6), the pen 700 is slightly separated and an image similar to that of the state (4) is obtained. After this, the states appear in an order which is reverse to the order from the state (1) to the state (4). Only in the state (5) in the drawing, it is determined that light is input (the tip end of the pen is set in contact with the display screen) and light is not input (non-contact) in the other states. As a result, the following three determination conditions can be used.

The first condition is that a deviation amount expressing the degree of deviation of the area W5(*t*) from a reference value W0 is smaller than a specified threshold value α. In the example of FIG. 18A, the area W5(*t*) is kept set at a constant value of approximately 230 while the pen is being set in the contact state. A value obtained by dividing the absolute value of the difference (W5(*t*)−W0) with respect to the reference value by W0 or peripheral length L(*t*) is used as the above deviation amount. Therefore, the first condition is expressed by the following equation (3) or (4).

$$\frac{|W_5(t) - W_0|}{W_0} < \alpha \quad (3)$$

$$\frac{|W_5(t) - W_0|}{L(t)} < \alpha \quad (4)$$

It is necessary to previously determine the reference value $W_0$ by the calibration operation. For example, the average values of the areas of light receiving areas are measured while the user keeps pressing the tip end of the pen against the display screen for several seconds each time a new pen is used and the measured value is set as $W_0$. Alternatively, since the area at the contact time corresponds to the area of the opening of the pen, $W_0$ can be derived by use of the area of the opening of the pen if it is known. Likewise, $\alpha$ may be determined by sliding the tip end of the pen in the display screen while it is pressed against the display screen and measuring the approximate value of the maximum value of a deviation amount during the above sliding time. Further, by adjusting the threshold value $\alpha$, it is possible to set the state in which it is determined that the pen is set in the contact state even when the tip end thereof is slightly separated from the display screen or it is not determined that the pen is set in the contact state if the tip end thereof is firmly pressed against the display screen according to the taste of the user.

The second condition is that an amount of variation in the area $W_5(t)$ with time is smaller than a specified threshold value $\beta$. In the example of FIG. 18A, it is understood that the area $W_5(t)$ does not substantially vary with time while the pen is kept in the contact state. As the variation amount with time, a value obtained by dividing the absolute value of the difference between the area $W_5(t)$ and the area $W_5(t-1)$ in the preceding image-sensing frame by the area $W_5(t)$ or peripheral length $L(t)$ is used. Therefore, the second condition is expressed by the following equation (5) or (6).

$$\frac{|W_5(t) - W_5(t-1)|}{W_5(t)} < \beta \quad (5)$$

$$\frac{|W_5(t) - W_5(t-1)|}{L(t)} < \beta \quad (6)$$

It is also possible to previously determine the threshold value $\beta$ by the calibration operation.

For example, the approximate value of the maximum value of a variation amount with time is measured in the area which satisfies the first condition (sufficiently close to $W_0$) while the user is performing the tap operation at the desired speed and the threshold value may be determined by use of the measurement. By adjusting the threshold value $\beta$, the tap operation speed can be set according to the taste of the user.

The third condition is that the degree of roundness of the light receiving area is larger than a specified threshold value $\gamma$. In this case, the degree of roundness is a scale expressing the "circle-like shape" of an area. As the degree of roundness, a value obtained by dividing the product of the area $W_5(t)$ and $4n$ by the square of the peripheral length $L(t)$ or dividing the product of the area $W_9(t)$ and $4n$ by the square of the peripheral length $L(t)$ is used. The degree of roundness becomes closer to "1" as the area becomes closer to a circle and it becomes smaller as the area becomes complex.

In the example of FIG. 18B, the light receiving area becomes almost circular in the contact state and becomes complex in the non-contact state.

Therefore, the third condition is expressed by the following equation (7) or (8).

$$\frac{4\pi W_5(t)}{L(t)^2} > \gamma \quad (7)$$

$$\frac{4\pi W_9(t)}{L(t)^2} > \gamma \quad (8)$$

It is also possible to previously determine the threshold value $\gamma$ by the calibration operation. When the pen is inclined, the light receiving area is changed from the circle to an ellipse and the degree of roundness becomes smaller. Therefore, the approximate value of the smallest degree of roundness may be measured when the user inclines the pen in a normal-use range while the tip end of the pen is kept set in the contact state. By adjusting the threshold value $\gamma$, it is determined that the pen is set in the non-contact state when the pen is inclined to a certain extent according to the taste of the user.

Figure 18A:
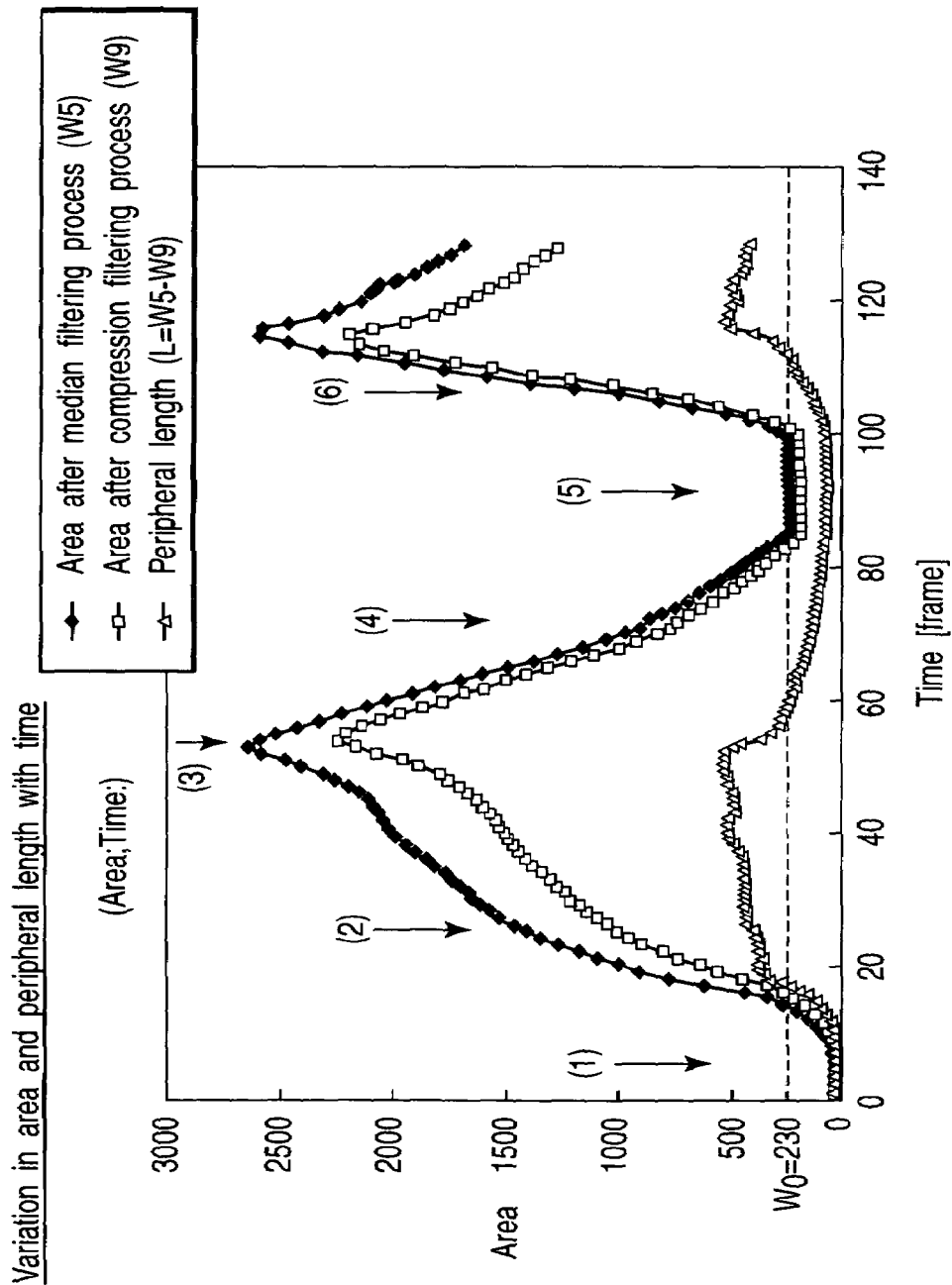
FIG. 18A is an explanatory diagram showing an filter output and operation output when a light pen 700 is set closer to and apart from the display screen 130 of an LCD 100.
Figures 18B, 18C:
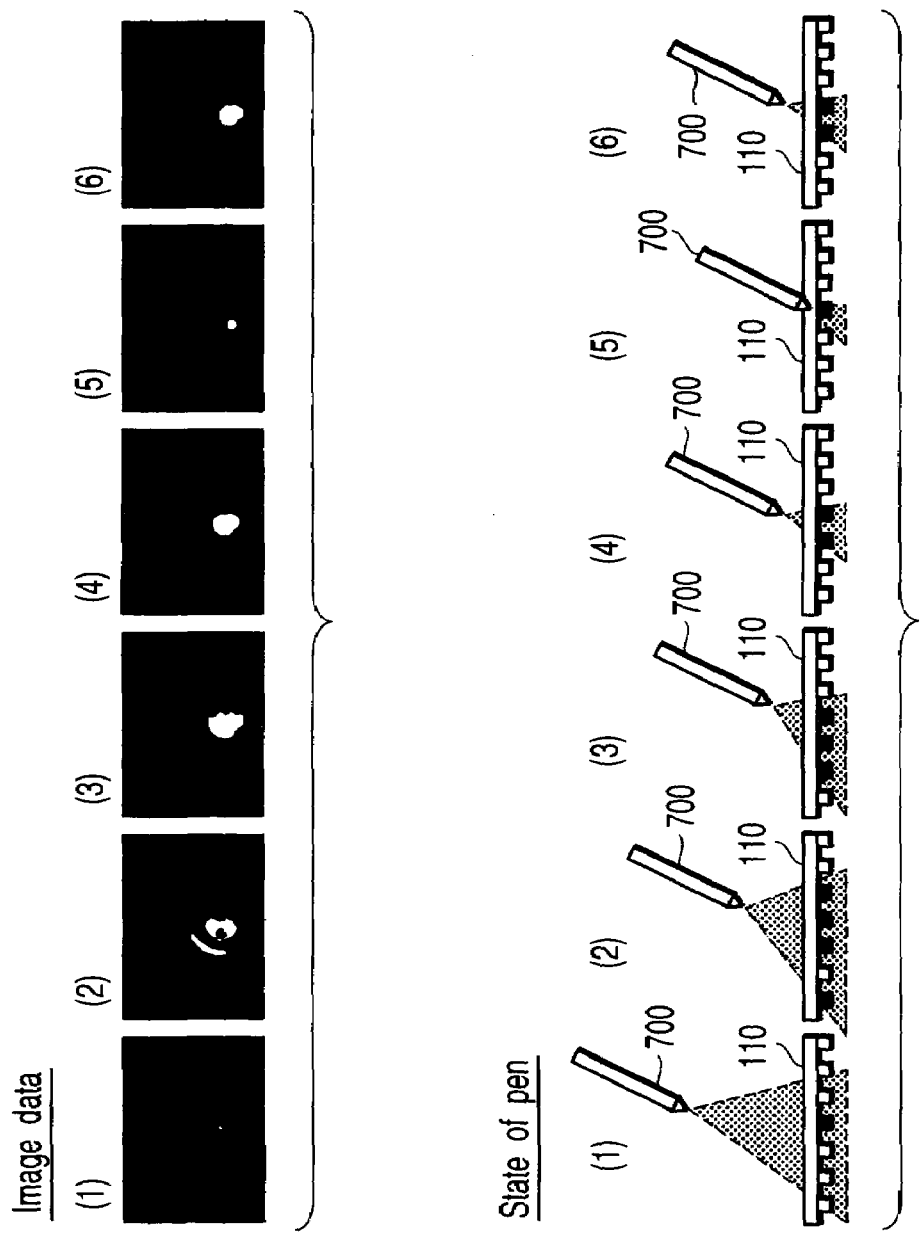
FIG. 18B is an explanatory view showing the state of output image data when the light pen 700 is set closer to and apart from the display screen 130 of the LCD 100.
FIG. 18C is an explanatory view showing the state in which the light pen 700 is set closer to and apart from the display screen 130 of the LCD 100.
Figure 19A:
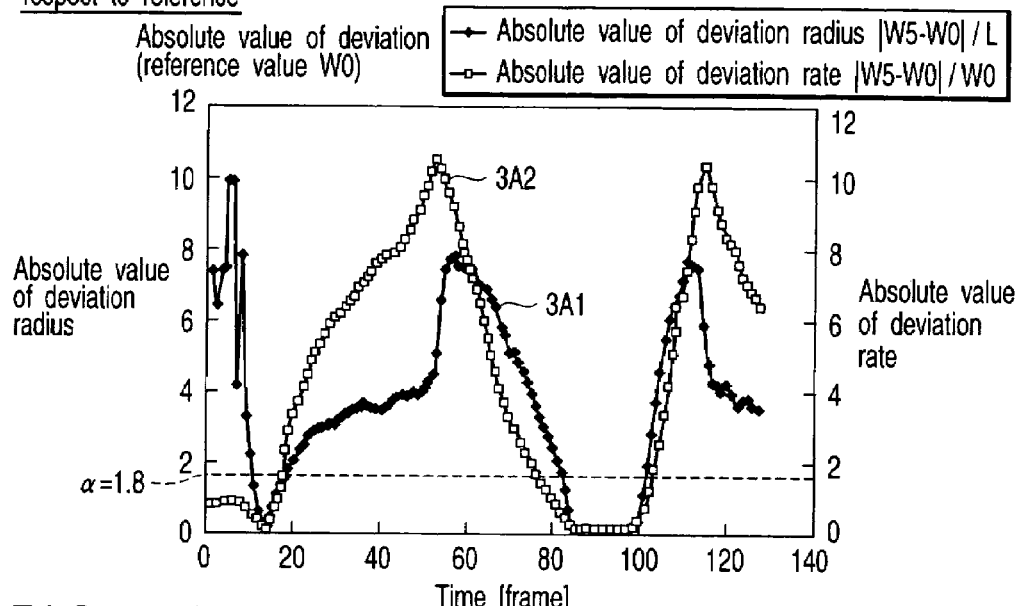
FIGS. 19A, 19B, 19C are explanatory diagrams for illustrating a case wherein deviation amounts between data items of FIGS. 18A and 18B and a reference value, variation amounts of the above data with time and the degrees of roundness based on the above data are derived and expressed in a graph.
Figure 19B:
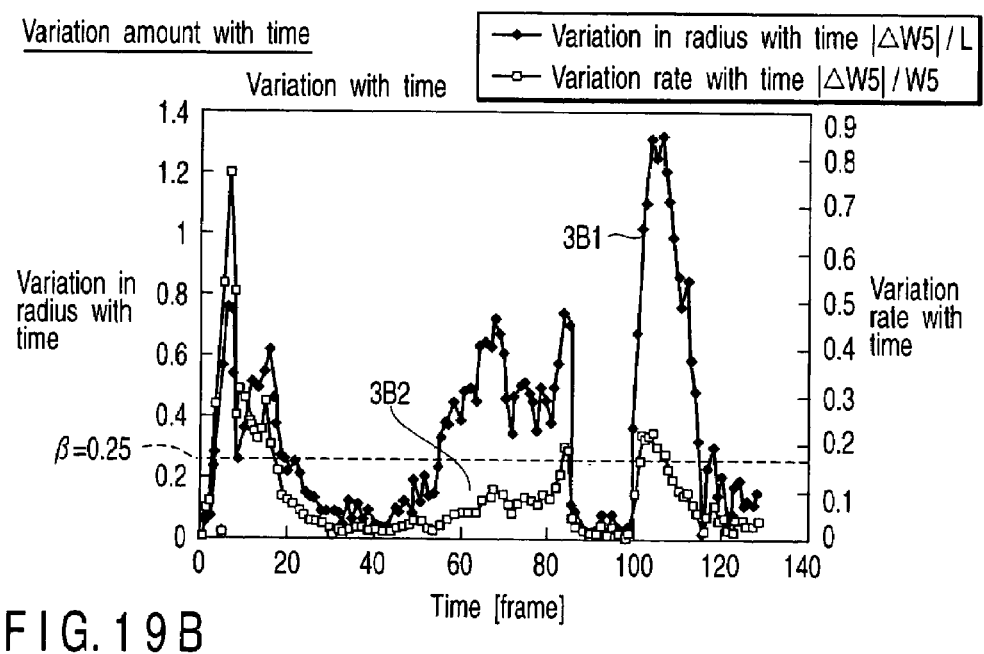
Figure 19C:
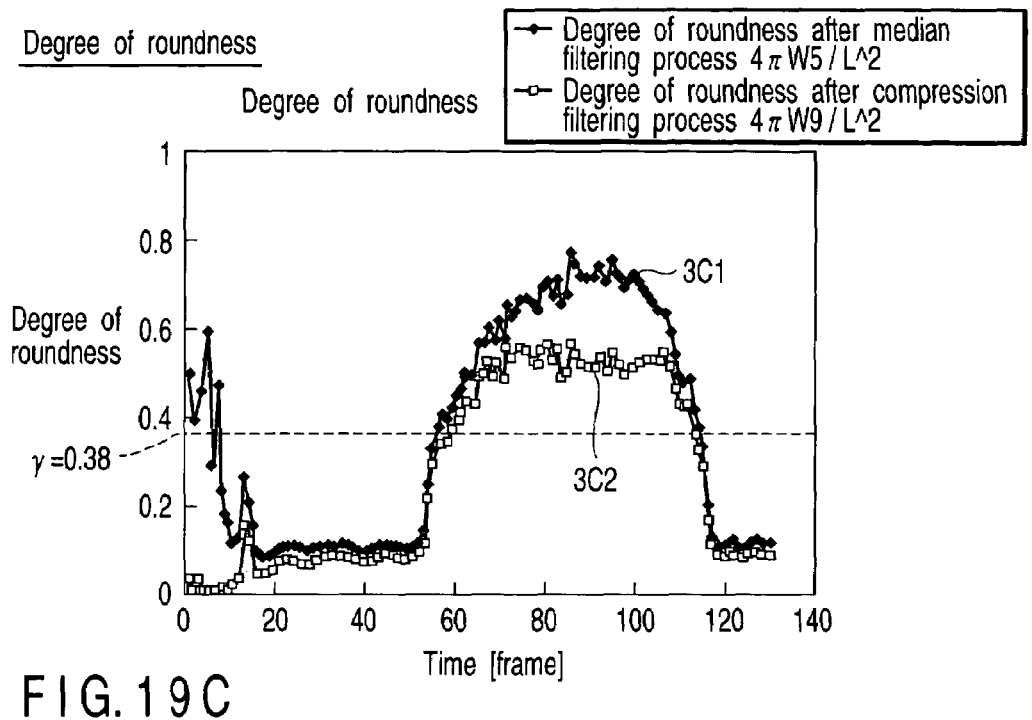

FIGS. 19A, 19B, 19C are graphs showing deviation amounts of data of FIGS. 18A to 18C from the reference value, variation amounts of the data with time and the degrees of roundness based on the data.

FIG. 19A shows the absolute value 3A1 of a deviation amount of the radius of the area W5 with respect to the reference area W0 and a deviation rate 3A2 of the area W5 with respect to the reference area W0. FIG. 19B shows the absolute value 3A1 of a deviation amount of the radius of the area W5 with respect to the reference area W0, a variation radius 3B1 caused when the radius of the area W5 varies with time and a variation rate 3B2 of the area W5.

FIG. 19C shows the degree 3C1 of roundness of an image after it is processed by the median filter and the degree 3C2 of roundness of an image after it is processed by the compression filter.

Figure 20:
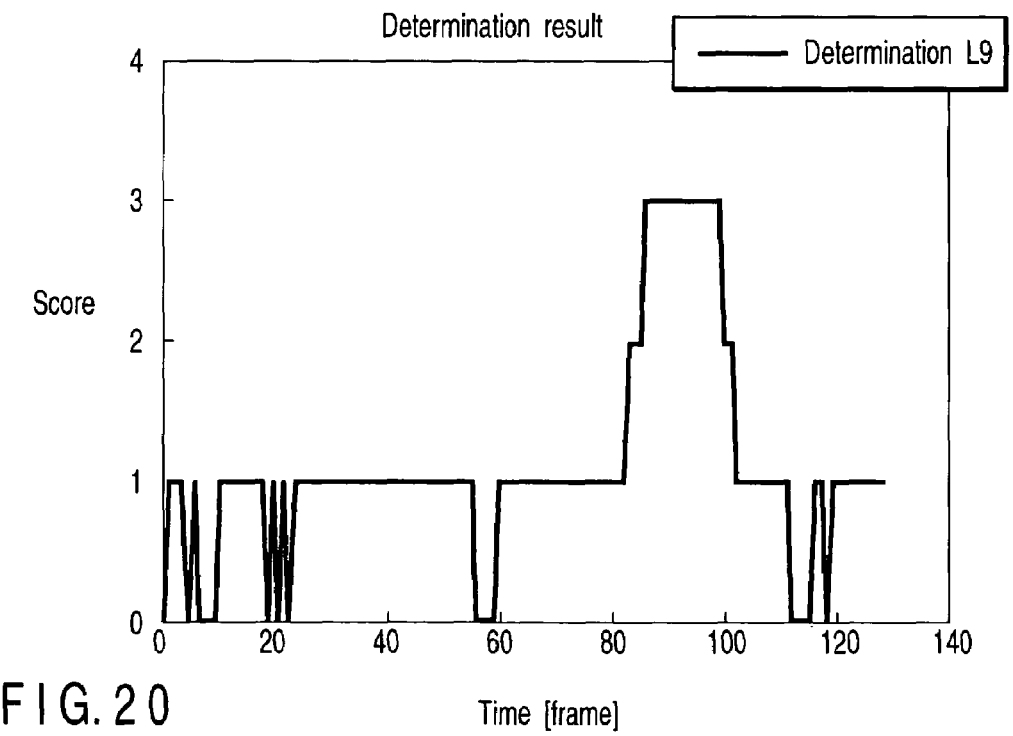
FIG. 20 is an explanatory diagram showing the number of determination conditions satisfied by data items of FIGS. 18A and 18C in a graph form by respectively setting threshold values $\alpha$, $\beta$ and $\gamma$ to 1.8, 0.25 and 0.38 with respect to data items of FIGS. 18A and 18C and determining the contact state.

FIG. 20 is a graph showing the number of determination conditions which data satisfies in a case wherein the threshold values $\alpha$, $\beta$ and $\gamma$ are respectively set to 1.8, 0.25 and 0.38 for data items of FIGS. 19A to 19C and the contact determination process is performed. As the determination conditions, the equation (4) (corresponding to the score "1"), the equation (6) (corresponding to the score "2") and the equation (8) (corresponding to the score "3") are used.

It is understood that contact determination is correctly made based on the time at which the pen is actually set in the contact state by simultaneously imposing the three conditions. It is possible to make contact determination by use of one or two of the three conditions, but as is clearly understood from FIGS. 19A to 19C and FIG. 20, it is necessary to strictly set the threshold value so as to prevent erroneous determination from being made. Therefore, it is preferable to simultaneously impose the three conditions.

Figure 21:
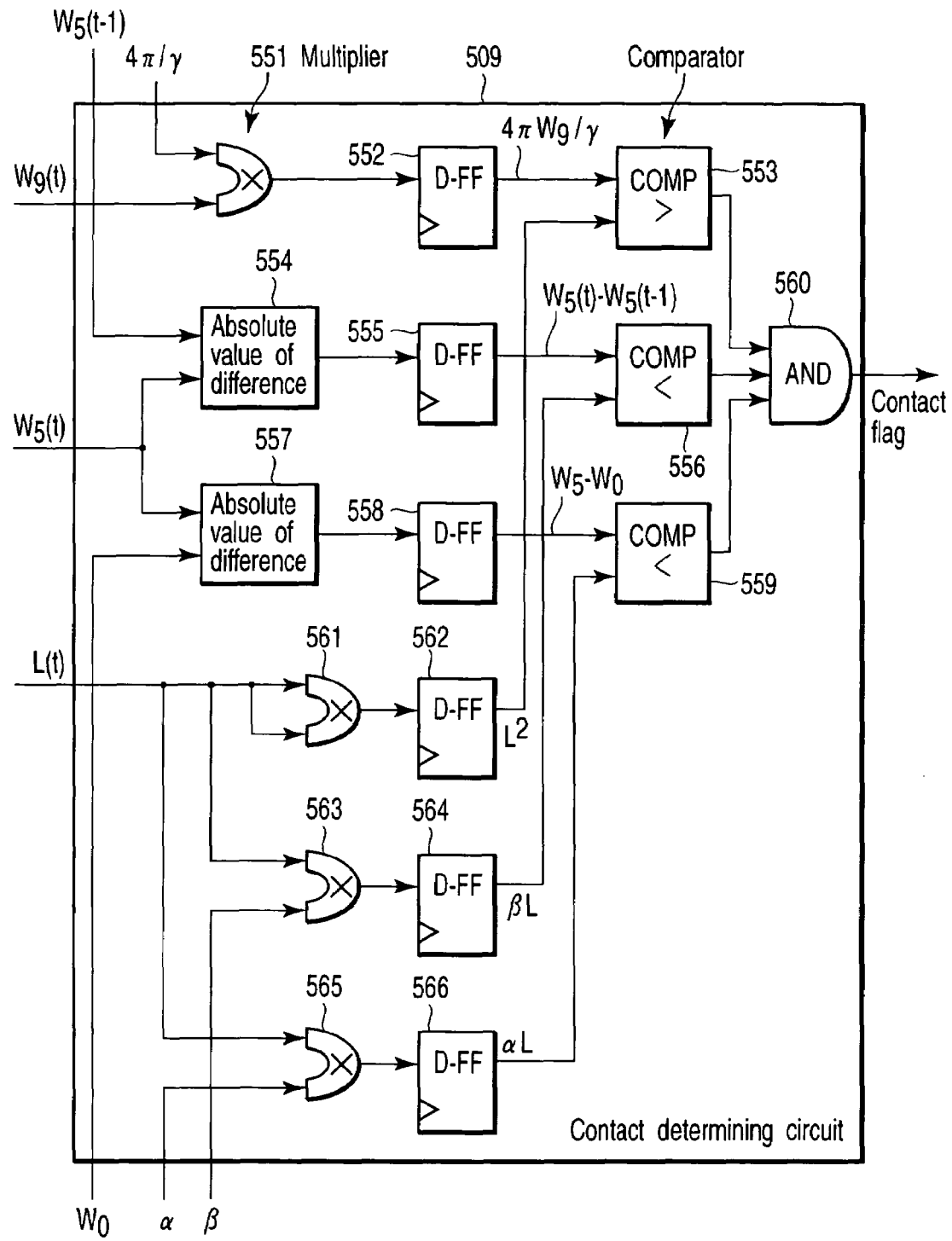
FIG. 21 is a diagram showing an example of the configuration of a contact determination circuit 509 which outputs a contact flag.

FIG. 21 shows an example of the concrete configuration of the contact determination circuit 509 which determines contact/non-contact in the three determination conditions and outputs a contact flag. The circuit 509 is operated by a clock which is in synchronism with the field frequency and generates a determination output indicating whether the light pen is set in the contact state or not for each previously set area unit.

As the determination conditions, the equations (4), (6) and (8) are used and the terms of the equations are transposed to eliminate the dividing circuit. Therefore, $4n/\gamma$ is input instead of the threshold value $\gamma$.

In FIG. 21, a plurality of multipliers, difference absolute value circuits and comparators are used as combinational circuits to process the conditions in parallel. However, it is possible to reduce the circuit scale by commonly utilizing the combinational circuits and processing the conditions in a pipe-line fashion.

In FIG. 21, a multiplier 551 multiplies the area W9($t$) by ($4\pi/\gamma$). The result of multiplication is held in a delay flip-flop (D-FF) 552. An output of the D-FF 552 is input to a comparator 553 and compared with the square of the peripheral length L($t$). That is, the system performs the process of the equation (8).

A difference absolute value circuit 554 derives the absolute value of the difference between W5($t$−1) and W5($t$). The absolute value is latched in a D-FF 555. An output of the D-FF 555 is input to a comparator 556 and compared with βL (β times the peripheral length L). That is, the system performs the process of the equation (6).

A difference absolute value circuit 557 derives the absolute value of the difference between W0 and W5($t$). The absolute value is latched in a D-FF 558. An output of the D-FF 558 is input to a comparator 559 and compared with αL (α times the peripheral length L). That is, the system performs the process of the equation (4).

Outputs of the comparators 553, 556, 559 are input to an AND circuit 560 and the logical product output is derived as a contact flag.

The system of a multiplier 561 and D-FF 562 is to derive the square value of the peripheral length L($t$). The system of a multiplier 563 and D-FF 564 is to derive βL obtained by multiplying the peripheral length L($t$) by β. The system of a multiplier 565 and D-FF 566 is to derive αL obtained by multiplying the peripheral length L($t$) by α. The values α, β can be stored in the threshold value register 511 of FIG. 17. The values α, β can be made variable. Therefore, the values α, β are used as factors which change the sensitivity characteristic used to attain a contact flag.

As described above, this invention includes a signal processing section which processes photosensing signals from a plurality of photosensing means, and in this example, an operation processing section which derives information of an area of a light receiving area on a display screen by use of a photosensing signal when light from the tip end of light source means is illuminated on the display screen and a determining section which determines that light is input when information of the area of the light receiving area is set within a predetermined parameter setting range.

This invention is not limited to the above embodiment. In the explanation of FIG. 17, when area information of the light receiving area is derived, the area is derived by use of binary image data indicating black and white. However, it is also possible to use image data having more gradations. That is, when image data of the light receiving area is extracted from image data having gradations, the threshold gradation value is set in the extracting circuit. Then, image data having higher luminance may be used as image data of the light receiving area. Further, the threshold value of gradation may be used as a variable parameter.

Figure 22:
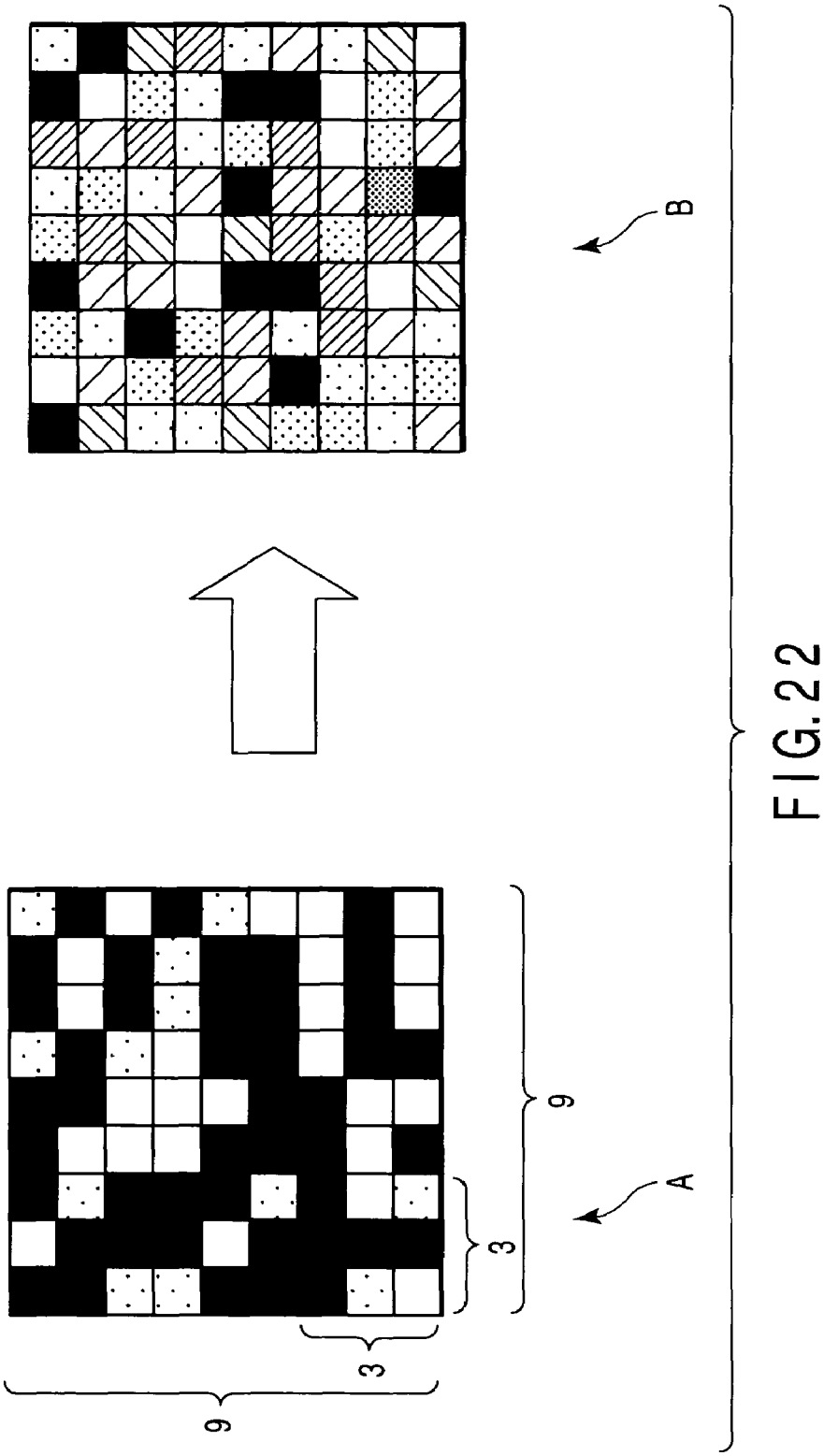
FIG. 22 is a view for illustrating an example of a method for attaining gradation image data by using 3 pixels×3 pixels as one unit.

In A, B of FIG. 22, a method for attaining gradation image data by using, for example, 3×3 pixels as one unit is shown. Each sensor corresponds to one pixel. The sensitivity of the sensor is different for each pixel. The sensitivity of the sensor is set as a magic square by using 3 pixels×3 pixels as one unit. The average value of binary-coded data items using 3 pixels×3 pixels shown in A of FIG. 22 as one unit block is derived. In FIG. 22, nine blocks are shown. The average value of one block is set as a gradation value of a target pixel. In B of FIG. 22, the gradation of each pixel is identified and shown.

FIG. 23 shows one example of a method for attaining a precise photosensing signal when light from the tip end of the light pen 700 used as a light source is applied to the display screen.

As shown in A of FIG. 23, suppose now that the light pen 700 is set to face the display screen of the LCD and noise light occurs. Further, suppose that the shape of pen light of the light pen 700 switches to a vertically long elliptic spot state and laterally long elliptic spot state with time as shown in B and C of FIG. 23.

D of FIG. 23 indicates a case wherein noise light and pen light of the light pen 700 are partially overlapped while time has elapsed from time T1 to time T5. As photographing (image-sensing) image data items P1 to P5 corresponding to the times T1 to T5, an image of the noise light and an image of the pen light are set into an overlapped state (times T1, T3) and set into a non-overlapped state (times T2, T4). In addition, there is provided a state in which light of the light pen is turned OFF (time T5). That is, there is provided a state in which an elliptic spot or laterally long elliptic spot does not appear. Therefore, in this invention, as noise reduction means, as indicated by an operation symbol E of FIG. 23, noise light other than pen light can be markedly reduced by subtracting image data set in the state in which an elliptic spot or laterally long elliptic spot does not appear from image data set in the state in which an elliptic spot or laterally long elliptic spot appears. The above process can be performed with respect to multi-gradation data as shown in FIG. 22.

Figure 24:
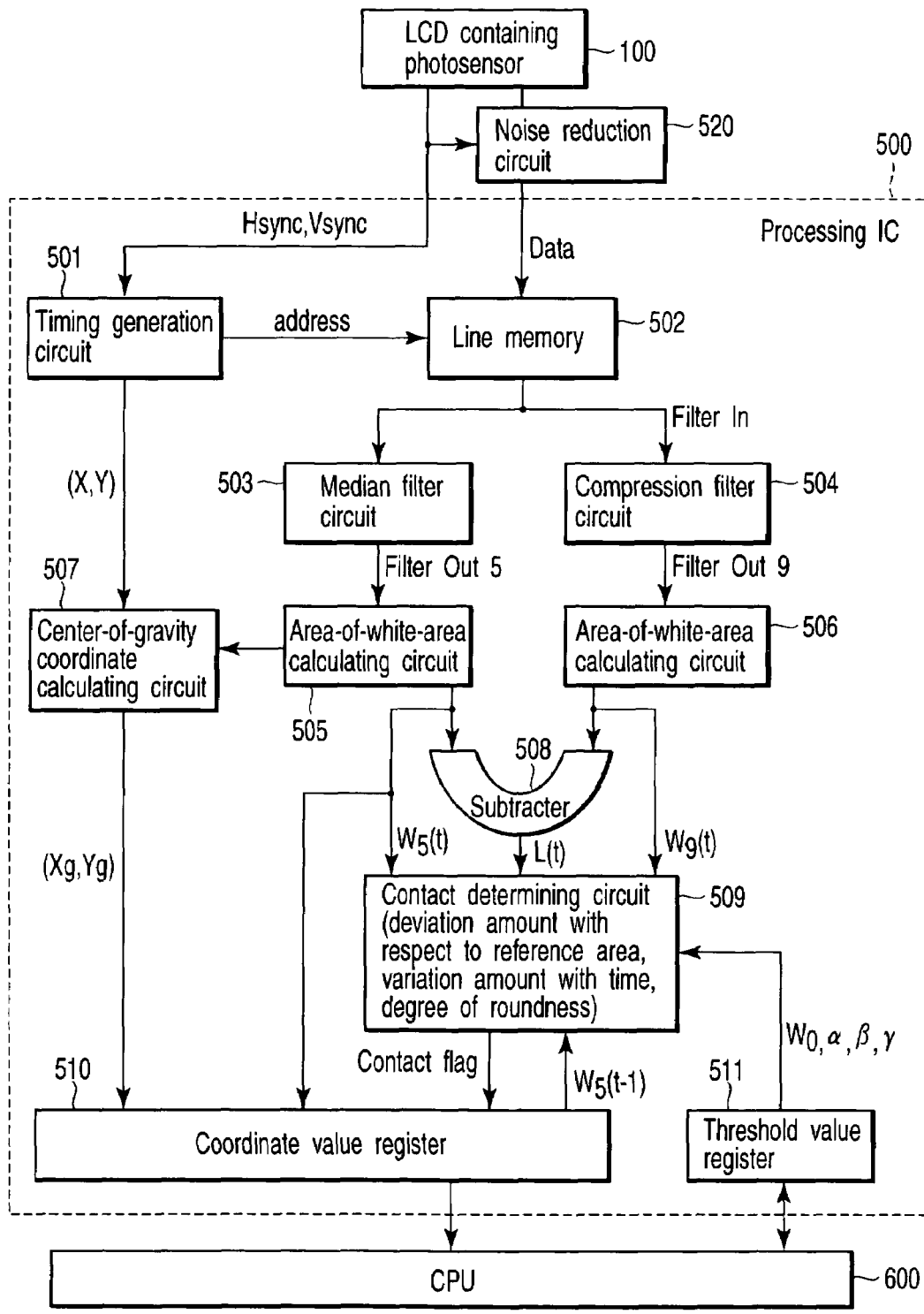
FIG. 24 is a configuration diagram showing another embodiment of this invention.

As shown in FIG. 24, the noise reduction circuit is provided between the LCD 100 and the line memory 502. Since the other portions are the same as those of the circuit of FIG. 17, the same symbols are attached to the like portions and the explanation thereof is omitted. Data obtained after noise is reduced is binary-coded by use of a preset threshold value and transferred to the succeeding-stage processing circuit so as to be subjected to the above process.

When the present invention is applied to a small mobile telephone, a significant effect can be attained. According to the present invention, as external input means, the LCD contained in the sensor circuit is used. The control and data readout means of the sensor circuit can be realized simply by additionally providing a small-scale circuit to the conventional display-exclusive circuit. Therefore, this invention can be easily applied to a device such as a small mobile telephone having a less spatial margin which is used to additionally provide parts. A signal line drive circuit of an LCD for mobile telephones is formed of a one-chip IC (which is hereinafter referred to as a driver IC) and is often used with the circuit attached to the array substrate. In this invention, a small capacity memory (auxiliary storage device) for data input by use of a light pen and a signal processing section 500 which processes data input by use of a light pen are integrally formed in the driver IC. The signal processing section 500 can be realized as a one-chip IC and can be configured by a parts area which is substantially equal to that of the conventional liquid crystal display device by attaching the same to an LCD panel as a driver IC.

Further, an I/O pin for video images can be used in a time sharing fashion without additionally providing an exclusive-use I/O pin between the signal processing section and the LCD. A video signal supplied from the signal drive circuit in the driver IC to each signal line of the array substrate has a preset blanking period. A protocol may be determined to output data input by use of the light pen to the signal processing section 500 during the blanking period. Therefore, it becomes unnecessary to increase the number of I/O pins of the driver IC and the cost of the driver IC can be suppressed.

Thus, the device of this invention can be attained without greatly changing the manufacturing process of the conventional liquid crystal display device. Further, this invention can be realized by use of an area which is substantially the same as that of the conventional liquid crystal display device.

Image position information input by use of a light pen or the like is output from the LCD to the exterior. However, image information can be directly transferred from the auxiliary storage device to the main memory device in the signal processing section 500. As a result, the image processing operation of transferring (displaying) an input image (for example, an image input in the right-side area) on the display screen to the display side (for example, left-side area) can be easily performed.

Further, in this invention, image information input by use of the light pen or the like can be converted into a voltage, the thus converted voltage can be compared with threshold voltage and a level used to recognize the image can be set. Further, a communication function can be provided between an input device (light pen) and a central processing section or CPU, for example. In this case, the communication function is provided and the sensitivity adjusting process can be attained via communication. That is, the coefficients of parameters such as $\alpha$, $\beta$ explained before can be adjusted. This is because it is sometimes required to adjust the input sensitivity of a mobile telephone since the mobile telephone is used in various environments (for example, in a bright place, in a dark place, in a room or outdoors).

The features of the above device can be described as follows. The device includes a plurality of scanning lines $X(n)$ arranged in parallel, a plurality of signal lines $Y(m)$ arranged to intersect with the plurality of scanning lines, a plurality of pixel portions 122 arranged at intersecting portions between the plurality of scanning lines and the plurality of signal lines, photosensor portions 124 at least one of which is provided for each or every preset number of the plurality of pixel portions 122, pixel drive sections 132, 134 which drive the plurality of pixel portions 122 via the plurality of scanning lines and the plurality of signal lines, and sensor drive sections 136, 138 which drive the photosensor portions. Further, the device includes output processors 136, 138 each containing an interpolation filter which is supplied with outputs from the photosensor portions and compensates for gradation values of an image obtained from the photosensor portions.

The above device can be explained as follows. The device includes operation processing sections 501 to 508 which derive information of the area of a light receiving area on the display screen by use of a photosensing signal when outputs of the photosensors are supplied and light from the tip end of the light source is illuminated on the display screen, and a determining section (509) which determines that the light is input when the information of the area of the light receiving area lies within a preset parameter setting range.

Further, the above device can be explained as follows. The device includes a plurality of scanning lines arranged in parallel, a plurality of signal lines arranged in parallel to intersect with the plurality of scanning lines, a plurality of display means arranged at a plurality of intersecting portions between the scanning lines and the signal lines, and a plurality of photosensing means arranged at the plurality of intersecting portions. Further, light source means for illuminating light from the tip end thereof is used. The device is a display device with an optical input function in which an image is displayed on the display screen by use of the plurality of display means, light illuminated on the display screen by the light source means is detected by the plurality of photosensing means and information is input based on the detected information.

Further, the device includes light receiving area detecting means 501 to 508 which detect a light receiving area on the display screen illuminated by light from the tip end of the light source based on photosensing signals from the plurality of photosensing means, operating means 557, 558, 559 which calculate a deviation amount of the area of the light receiving area from a reference value by comparing the area of the light receiving area with a specified reference area value, and contact determining means 565, 566, 559, 560 which determine that the light source means is set in contact with the display screen when the deviation amount from the reference value is smaller than a specified deviation amount threshold value.

The device includes the light receiving area detecting means 501 to 508, operating means 554, 555, 556 which calculate a variation amount in the area of the light receiving area with time, and contact determining means 563, 564, 556, 560 which determine that the light source means is set in contact with the display screen when the variation amount with time is smaller than a specified threshold value of the variation amount with time.

Further, the device includes operating means 551, 552, 553 which calculate the degree of roundness of the light receiving area based on the area and peripheral length of the light receiving area, and contact determining means 561, 562, 563, 560 which determine that the light source means is set in contact with the display screen when the degree of roundness is larger than a specified threshold value of the degree of roundness.

This invention is not limited to the above embodiments as it is and can be variously embodied by modifying the constituents without departing from the technical scope thereof at the embodying stage. Further, various inventions can be made by adequately combining a plurality of constituents disclosed in the above embodiments. For example, some constituents can be omitted from all of the constituents shown in the above embodiments. Further, constituents disclosed in different embodiments can be adequately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device with an optical input function comprising:
    a plurality of scanning lines arranged in parallel,
    a plurality of signal lines arranged to intersect with the plurality of scanning lines,
    a plurality of pixel portions arranged at intersecting portions between the plurality of scanning lines and the plurality of signal lines,
    photosensor portions provided at least one for each or every preset number of the plurality of pixel portions,
    a pixel drive section which drives the plurality of pixel portions via the plurality of scanning lines and the plurality of signal lines,
    a sensor drive section which drives the photosensor portions,
    an operation processing section which is supplied with outputs of the photosensor portions and derives information of an area of a light receiving area on a display screen by use of photosensing signals when light from a tip end of a light source is illuminated on the display screen, and a determining section which determines that the light source is set in contact with the display screen when the following conditions (a), (b), and (c) are satisfied, (a) a first operating section which compares the information of the area of the light receiving area with a specified area reference value and calculates a deviation amount from the reference value, wherein the deviation amount from the reference value is smaller than a first specified threshold value of the deviation amount, (b) a second operating section which calculates a variation amount of the area of the light receiving area with time, wherein the variation amount with time is smaller than a second specified threshold value of the variation amount with time, and (c) a third operating section which calculates a degree of roundness of the light receiving area based on the area and a peripheral length of the light receiving area, wherein the degree of roundness is larger than a third specified threshold value of the degree of roundness.

2. The display device with the optical input function according to claim 1, wherein the information of the area of the light receiving area comprises a plurality of information items which include first area information obtained by use of an output of a median filter and second area information obtained by use of an output of a compression filter and the parameters include a square value of the peripheral length derived based on a difference between the first and second area information items and a multiplication value obtained by multiplying the peripheral length by a variable coefficient.

3. The display device with the optical input function according to claim 1, wherein the area reference value is set based on an area of an opening portion at the tip end of the light source.

4. The display device with the optical input function according to claim 1, further comprising:
a first calibration section configured to previously calculate and store the area reference value.

5. The display device with the optical input function according to claim 1, further comprising:
a second calibration section configured to previously calculate and store the first specified threshold value of the deviation amount.

6. The display device with the optical input function according to claim 1, further comprising:
a third calibration section configured to previously calculate and store the second specified threshold value of the deviation amount with time.

7. The display device with the optical input function according to claim 1, further comprising:
a fourth calibration section configured to previously calculate and store the third specified threshold value of the degree of roundness.

8. The display device with the optical input function according to claim 1, further comprising:
an output processing section including an interpolation filter and an A/D convener which generates digital image data based on photosensing signals of the photosensor portions, the interpolation filter being supplied with an output of the A/D converter and performs a filtering process to 1) rearrange gradation values of the digital image data corresponding to the preset one of the pixel portions and at least one pixel portion which lies near the preset one of the pixel portions in one of ascending and descending orders and 2) set a gradation value having a specified order as a gradation value of the preset one of the pixel portions.

* * * * *